United States Patent
Sato et al.

(10) Patent No.: US 7,921,435 B2
(45) Date of Patent: Apr. 5, 2011

(54) OPTICAL DISK DRIVE

(75) Inventors: Takahiro Sato, Osaka (JP); Katsuya Watanabe, Nara (JP)

(73) Assignee: Panasonic Corporation, Osaka (JP)

( * ) Notice: Subject to any disclaimer, the term of this patent is extended or adjusted under 35 U.S.C. 154(b) by 927 days.

(21) Appl. No.: 11/574,068

(22) PCT Filed: Mar. 16, 2006

(86) PCT No.: PCT/JP2006/305290
§ 371 (c)(1),
(2), (4) Date: Feb. 22, 2007

(87) PCT Pub. No.: WO2006/098412
PCT Pub. Date: Sep. 21, 2006

(65) Prior Publication Data
US 2008/0285421 A1    Nov. 20, 2008

(30) Foreign Application Priority Data

Mar. 17, 2005  (JP) ................................. 2005-076808

(51) Int. Cl.
*G11B 7/00* (2006.01)
(52) U.S. Cl. ....................... 720/659; 369/30.1
(58) Field of Classification Search ............... 369/30.03, 369/30.04, 30.05, 30.1–30.17, 44.27, 44.29, 369/52.1; 720/659–670
See application file for complete search history.

(56) References Cited

U.S. PATENT DOCUMENTS

| | | | |
|---|---|---|---|
| 4,837,784 A | 6/1989 | Yamamori | |
| 5,689,482 A | 11/1997 | Iida | |
| 6,101,156 A | 8/2000 | Tanaka et al. | |
| 6,133,562 A | 10/2000 | Kuwayama | |
| 6,167,003 A * | 12/2000 | Haneji et al. | 369/53.11 |
| 2004/0136280 A1 | 7/2004 | Fujiune et al. | |

(Continued)

FOREIGN PATENT DOCUMENTS

EP    1 316 949 A2    6/2003

(Continued)

OTHER PUBLICATIONS

U.S. Appl. No. 11/007,634, filed Jan. 1999, Itagaki Takehito.*

(Continued)

*Primary Examiner* — Tan X Dinh
*Assistant Examiner* — Andrew J Sasinowski
(74) *Attorney, Agent, or Firm* — Renner, Otto, Boisselle & Sklar, LLP

(57) ABSTRACT

An optical disk drive according to the present invention includes: an optical pickup 6 including a light source 23 that radiates a light beam 21 to irradiate an optical disk 100, at least one objective lens 22 for converging the beam 21, and an actuator that can move the lens 22 perpendicularly to the disk 100; a transport stage 11 for displacing the pickup 6 in a disk radial direction; a rim detecting section 30 for sensing if the irradiated position of the beam 21 has passed an outer edge of the disk 100 while the pickup 6 is being displaced from an inner area of the disk toward the outer edge thereof to conduct a seek operation; and a control section 40 for getting the lens 22 retracted away from the disk 100 by the actuator and getting the pickup 6 displaced toward the inner area of the disk by the transport stage 11 if the irradiated position of the light beam 21 has been sensed to have passed the outer edge of the disk 100.

16 Claims, 15 Drawing Sheets

U.S. PATENT DOCUMENTS

| | | | |
|---|---|---|---|
| 2005/0007906 A1 | | 1/2005 | Horinouchi et al. |
| 2006/0007838 A1* | | 1/2006 | Nakata et al. ............ 369/112.12 |

FOREIGN PATENT DOCUMENTS

| | | | |
|---|---|---|---|
| GB | 2 029 051 A | | 3/1980 |
| JP | 64-001174 | | 1/1989 |
| JP | 05-135406 | | 6/1993 |
| JP | 06-301983 | | 10/1994 |
| JP | 07-225958 | | 8/1995 |
| JP | 09-259444 | | 10/1997 |
| JP | 09-305981 | * | 11/1997 |
| JP | 11-007634 | | 1/1999 |
| JP | 11-120599 | | 4/1999 |
| JP | 11-191223 | | 7/1999 |
| JP | 11-265512 | | 9/1999 |
| JP | 11-273092 | | 10/1999 |
| JP | 2002-123981 | | 4/2002 |
| JP | 2002-251728 | | 9/2002 |
| JP | 2002-304749 | | 10/2002 |
| JP | 2003-091833 | | 3/2003 |
| JP | 2004-295983 | | 10/2004 |
| WO | 01/04882 A1 | | 1/2001 |

OTHER PUBLICATIONS

Japanese Office Action for corresponding application number JP2006-073457 dated Dec. 1, 2009, and English translation thereof.

ECMA: Standardizing Information and Communication Systems: "Standard ECMA-330:120 mm (4,7 Gbytes per side) and 80 mm (1,46 Gbytes per side) DVD Rewritable Disk (DVD-RAM)", Dec. 1, 2001, Standard ECMA, XP002310606.

Extended European Search Report in corresponding European Patent Application No. 06729283.9 dated Oct. 24, 2008.

Office Action for corresponding European Patent U.S. Appl. No. 06729283.9 dated Feb. 4, 2010.

Standard ECMA-130, $2^{nd}$ edition "Data interchange on read-only 120mm optical data disks (CD-ROM)", Jun. 1996, XP 007905229.

International Search Report for corresponding Application No. PCT/JP2006/305290 mailed Apr. 11, 2006.

Form PCT/ISA/237 and a concise explanation, Feb. 22, 2007.

Communication for corresponding European Application No. 06 729 283.9 dated Feb. 9, 2011.

* cited by examiner

OPTICAL DISK DRIVE

TECHNICAL FIELD

The present invention relates to an optical disk drive.

BACKGROUND ART

In optical disk technologies, data can be read out from a rotating optical disk by irradiating the disk with a relatively weak light beam with a constant intensity, and detecting the light that has been modulated by, and reflected from, the optical disk.

On a read-only optical disk, information is already stored as pits that are arranged spirally during the manufacturing process of the optical disk. On the other hand, on a rewritable optical disk, a recording material film, from/on which data can be read and written optically, is deposited by an evaporation process, for example, on the surface of a substrate on which tracks with spiral lands or grooves are arranged. In writing data on such a rewritable optical disk, data is written there by irradiating the optical disk with a light beam, of which the optical power has been changed according to the data to be written, and locally changing the property of the recording material film.

It should be noted that the depth of the pits, the depth of the tracks, and the thickness of the recording material film are all smaller than the thickness of the optical disk substrate. For that reason, those portions of the optical disk, where data is stored, define a two-dimensional plane, which is sometimes called a "storage plane" or an "information plane". However, considering that such an "information storage plane" has a physical dimension in the depth direction, too, the term "storage plane (or information plane)" will be replaced herein by another term "information storage layer". Every optical disk has at least one such information storage layer. Optionally, a single information storage layer may actually include a plurality of layers such as a phase-change material layer and a reflective layer.

To read data that is stored on an optical disk or to write data on a recordable optical disk, the light beam always needs to maintain a predetermined converging state on a target track on an information storage layer. For that purpose, a "focus control" and a "tracking control" are required. The "focus control" means controlling the position of an objective lens perpendicularly to the information storage layer (which direction will be referred to herein as a "substrate depth direction") such that the focus position (or converging point) of the light beam is always located on the information storage layer. On the other hand, the "tracking control" means controlling the position of the objective lens along the radius of a given optical disk (which direction will be referred to herein as a "disk radial direction") such that the light beam spot is always located right on a target track.

Various types of optical disks such as DVD (digital versatile disc)-ROM, DVD-RAM, DVD-RW, DVD-R, DVD+RW and DVD+R have become more and more popular these days as storage media on which a huge amount of information can be stored at a high density. Among other things, CDs (compact discs) are still popular now. Currently, next-generation optical disks, including Blu-ray disc (BD) and HD-DVD, which can store an even greater amount of information at a much higher density, are under development, and some of them have already been put on the market.

To increase the storage density of an optical disk, the light beam that has been converged on the data plane of an optical disk preferably has as small a spot size as possible. The spot size of a light beam is inversely proportional to the numerical aperture NA of an objective lens for use to converge the light beam. Thus, by increasing the numerical aperture NA of the objective lens, the spot size of the light beam can be decreased.

The numerical aperture NA of an objective lens is inversely proportional to the focal length of the objective lens. That is why in an optical disk drive that uses an objective lens with a high numerical aperture NA, the distance from the objective lens to a given optical disk (which will be referred to herein as a "working distance") becomes very short. A DVD player (with an NA of 0.6) usually has a working distance of 0.6 mm to 0.8 mm, while a dedicated BD player (with an NA of 0.8 or more) normally has a working distance of 0.1 mm to 0.3 mm.

If the working distance decreases as the numerical aperture NA increases in this manner, the objective lens is more and more likely to collide against the optical disk, which is a problem. Thus, the distance between the objective lens and the optical disk should be kept within a predetermined range by avoiding such "collision". While the focus control is ON, the position of the objective lens is controlled such that the focal point (converging point) of the light beam is always located on the information storage layer as described above. That is why such collision rarely occurs. On the other hand, if the servo loop for establishing a focus control has failed to work for some reason during a read or write operation (i.e., in case of defocusing), then retraction processing is carried out immediately to retract the objective lens as far away from the optical disk as possible. However, before the focus control is resumed, the objective lens may still collide against the optical disk. Hereinafter, this point will be described.

Portion (a) of FIG. 1 schematically illustrates how the gap between the surface 100a of an optical disk 100 and an objective lens 22 decreases gradually. This optical disk 100 includes a substrate 112, which is transparent to a laser beam, an information storage layer 114 that has been formed on the substrate 112, and a protective layer (coating layer) 116 that covers the information storage layer 114. The optical disk 100 illustrated in portion (a) of FIG. 1 corresponds to a BD and the coating layer 16 has a thickness of about 0.1 mm.

Portion (a) of FIG. 1 illustrates a situation where the focal point of the laser beam 21 is located on the surface 100a of the optical disk, a situation where the focal point of the laser beam 21 is located on the information storage layer 114, and a situation where the focal point of the laser beam 21 is located inside the substrate 112. Portion (b) of FIG. 1 schematically shows a focus error (FE) signal to be generated when the focal point of the laser beam 21 varies with time. The focus error signal changes so as to draw a small S-curve when the focal point of the laser beam 21 passes the surface 100a of the optical disk. Portion (c) of FIG. 1 schematically shows the amplitude of a radio frequency (RF) read signal to be generated when the focal point of the laser beam 21 varies with time. When the focal point of the laser beam 21 passes the information storage layer 114 of the optical disk 100, the amplitude of the read signal shows a non-zero significant value. That is why when the amplitudes of the read signal and the focus error signal are both equal to or greater than their predetermined levels, it can be determined that the focal point of the laser beam 21 is now located in the vicinity of the information storage layer 114. If the focus servo is turned ON in such a situation, the position of the objective lens 22 is controlled such that the focus error signal is always equal to zero. Such an operation of turning the focus servo ON around the center of the S-curve of the focus error signal (i.e., near the zero-cross point of the focus error signal) when the S-curve is detected while the objective lens 22 is being moved toward the optical disk 100 in search of the information storage layer 114 will be referred to herein as a "focus finding operation".

The S-curve appears in a relatively narrow detection range (of several μm) of the focus error signal. For that reason, to get the focus finding operation done, the operation of catching the target information storage layer 114 into the detection range by shifting the focus position of the objective lens 22 sufficiently close to the information storage layer 114 of the optical disk 100 needs to be carried out. Such an operation of moving the objective lens 22 from a position that is far away from the optical disk 100 toward the optical disk 100 gradually in order to detect the S-curve is sometimes called a "focus search operation". The position of the objective lens 22 along the optical axis is adjusted by a lens actuator in the optical pickup. Thus, during the focus search operation, the objective lens 22 is moved toward the optical disk 100 by gradually increasing the drive current to be supplied to the lens actuator. And when the S-curve is detected in the focus error signal in the meantime, it can be determined that the target information storage layer 114 has now entered the detection range. Then, the servo operation is started and the amount of the drive current supplied to the focus actuator is controlled such that the S-curve of the focus error signal becomes equal to zero. Such a series of operations to be performed to establish the focus servo loop is sometimes called "focus ON processing".

During the focus ON processing, if the objective lens 22 is moved too fast along the optical axis until the S-curve appears in the focus error signal, then the focal point of the light beam 21 will pass the information storage layer 114 of the optical disk 100 so shortly that the objective lens 22 may come even closer to the optical disk 100 without detecting the S-curve properly. In that case, the objective lens 22 will collide against the optical disk 100. Such a problem can be solved to a certain degree by decreasing the moving velocity of the objective lens 22. However, if there is some scratch or dust on the optical disk 100, the S-curve may not be detected properly.

Patent Document No. 1 discloses a method of preventing the objective lens from colliding against the optical disk even if detection of the information storage layer has failed and the focus control cannot be started appropriately during the focus ON processing. Specifically, the optical disk drive disclosed in Patent Document No. 1 memorizes the drive voltage of the actuator and turns the focus drive voltage OFF when the drive voltage of the actuator exceeds a predetermined level during the focus ON processing. By adopting such a technique, even if the focus search has failed due to the presence of dust or scratch on the surface of the optical disk, the focus search is stopped before the objective lens collides against the optical disk.

Patent Document No. 1: Japanese Patent Application Laid-Open Publication No. 11-120599

DISCLOSURE OF INVENTION

Problems to be Solved by the Invention

An optical disk such as a DVD-RAM or a BD has a rim region on the outermost area thereof. This rim region has the function of protecting the data stored in the optical disk from dust, dirt and scratches when the optical disk is either taken out of the cartridge or in the bare state. The configuration of the rim region is defined by Standard ECMA-330 (120 mm and 80 mm DVD Rewritable Disk (DVD-RAM)), for example.

FIG. 2 illustrates the configuration of a rim region of a DVD-RAM. The optical disk 100 shown in FIG. 2 includes a raised portion 102 with the configuration defined by Standard ECMA-330. This raised portion 102 is provided between the radii d1 and d2 as measured from the center of the disk and has an increased thickness compared to most of the rest of the optical disk 100. The height of the raised portion 102 as measured from the surface of the disk is identified by h1.

If the optical disk 100 is a 120 mm disk, d1, d2 and h1 are 120.00 mm±0.30 mm, 117.00 mm±0.20 mm, and 0.20 mm at maximum, respectively. On the other hand, if the optical disk 100 is an 80 mm disk, d1, d2 and h1 are 80.00 mm±0.30 mm, 76.8 mm±0.20 mm, and 0.20 mm at maximum, respectively.

The region of the optical disk 100 where the raised portion 102 is located, i.e., the ringlike region between the radii d1 and d2 as measured from the center of the disk, is the rim region 101.

In this manner, in the rim region 101, the surface of the optical disk 100 protrudes as much as 0.2 mm toward the objective lens and the working distance is shorter by as much as 0.2 mm (=h1) than the other regions of the optical disk. Also, the rim region 101 is located in the outermost area of the optical disk 100, and therefore, is affected by the disk flutter (caused by the warp of the optical disk 100, for example) so significantly as to collide against the objective lens easily. For that reason, even if the displacement of the objective lens is controlled by adjusting the focus drive voltage to avoid the collision by the conventional technique described above, it is still difficult to prevent the objective lens from colliding against the rim region 101 of the optical disk 100 during the focus ON processing.

On top of that, the present inventors discovered and confirmed via experiments that if the beam spot of the light beam passed the outer edge of optical disk 100 during a seek operation to reach the space where the optical disk 100 was not present, there was a higher risk of collision between the optical pickup and the optical disk 100 while the light beam spot was being brought back onto the optical disk again. FIGS. 3(a) and 3(b) illustrate how the beam spot of the light beam goes over the raised portion 102 of the optical disk 100 during a seek operation. A lens protecting member 230 is arranged near the objective lens 22. The phenomenon that the beam spot of the light beam passes the outer edge of optical disk 100 during a seek operation to reach the space where the optical disk 100 is not present will be referred to herein as an "overrun". When such an overrun happens, neither the focus error signal nor the tracking error signal can be generated. And it is usually necessary to bring the light beam spot back onto the optical disk 100 by having the optical pickup make a traverse displacement while holding the objective lens where it was just before the overrun happened. However, if the optical pickup makes an inward traverse (i.e., toward the center of the disk) from the position shown in FIG. 3(b), then either the objective lens 22 or the lens protecting member 230 will collide against the raised portion 102 of the optical disk 100 as shown in FIG. 3(c), thus possibly scratching the optical disk 100 or the optical pickup.

Such a risk of collision between a portion of the optical pickup and the optical disk 100 is also high when the optical disk 100 has a diameter of 80 mm and is fitted into an adapter 150 before loaded into the optical disk drive as shown in FIGS. 4(a) and 4(b). This adapter 150 is a ringlike member for use to adapt an optical disk 100 with a diameter of 80 mm to an optical disk drive that is dedicated to optical disks with a diameter of 120 mm. The adapter 150 includes a protrusion (claw portion) 152 to grip the optical disk 100 thereon. The protrusion 152 is arranged so as to be about 40 mm away from the center of the disk inserted. When a seek operation is carried out on such an optical disk 100 with a diameter of 80 mm, the overrun happens often. That is why particularly when the optical pickup includes a high NA lens with a short working distance, collision occurs easily between the protrusion 152 of the adapter 150 and the optical pickup.

Also, even if no overrun has happened but if the focus servo has failed to work for some reason during a normal read or write operation, collision may also occur between the optical disk 100 and the optical pickup. Specifically, if the focus servo has failed to work when a portion of the optical pickup (e.g., the lens protecting member 230) faces the raised portion 102 of the optical disk 100 as shown in FIG. 5(*a*), then the objective lens 22 needs to be once retracted from the optical disk 100 to perform focus ON processing as shown in FIG. 5(*b*). After that, to resume the focus control, focus search is carried out with the objective lens 22 moved toward the optical disk 100 as shown in FIG. 5(*c*). In that case, the objective lens 22 may come so close to the optical disk 100 that a portion of the optical pickup (e.g., the lens protecting member 230) may collide against the raised portion 102.

FIG. 12 illustrates a portion of an optical pickup including an objective lens 9 for DVDs and an objective lens 22 for BDs within the same package. These lenses 9 and 22 are driven simultaneously by an actuator. That is why while data is being read from, or written on, a DVD by using the objective lens 9 that is less likely to collide, either the high NA objective lens 22 or the lens protecting member 230 may collide against the raised portion 102 of the optical disk 100. That is to say, if an optical pickup includes both an objective lens 9 for DVDs and an objective lens 22 for BDs, collision against the raised portion 102 of the optical disk 100 may also happen even while a read/write operation is carried out on a DVD.

In order to overcome the problems described above, an object of the present invention is to provide an optical disk drive that can prevent the objective lens from colliding against even such an optical disk with a raised portion.

Means for Solving the Problems

An optical disk drive according to the present invention includes: an optical pickup including a light source that radiates a light beam to irradiate an optical disk, at least one objective lens for converging the light beam, and an actuator that is able to move the objective lens perpendicularly to the optical disk; transport means for displacing the optical pickup along the radius of the optical disk; sensing means for sensing if the irradiated position of the light beam has passed an outer edge of the optical disk while the optical pickup is being displaced from an inner area of the optical disk toward the outer edge thereof by the transport means to conduct a seek operation; and control means for getting the objective lens retracted away from the optical disk by the actuator and getting the optical pickup displaced toward the inner area of the optical disk by the transport means if the irradiated position of the light beam has been sensed to have passed the outer edge of the optical disk.

In one preferred embodiment, while the actuator is retracting the objective lens away from the optical disk right after the irradiated position of the light beam has been sensed to have passed the outer edge of the optical disk, the control means gets the optical pickup retracted away from the optical disk for a distance that is greater than the height of a raised portion of the optical disk.

In this particular preferred embodiment, the control means starts focus ON processing after having gotten the optical pickup displaced inside of the raised portion of the optical disk.

In another preferred embodiment, the control means gets the objective lens retracted away from the optical disk for a variable distance according to the diameter of the optical disk.

In still another preferred embodiment, if the optical disk has a diameter of 80 mm, the distance is defined shorter than a situation where the optical disk has a diameter of 120 mm.

In yet another preferred embodiment, the sensing means is able to sense whether or not the objective lens is located at such a position as to face the raised portion of the optical disk.

In this particular preferred embodiment, if the objective lens is located at such a position as to face the raised portion of the optical disk when a focus servo fails to work during a read or write operation, the control means gets the objective lens retracted away from the optical disk by the actuator and also gets the optical pickup displaced inside of the raised portion.

In a specific preferred embodiment, the control means starts focus ON processing after having gotten the optical pickup displaced inward.

In yet another preferred embodiment, the at least one objective lens includes a first objective lens having a first numerical aperture and a second objective lens having a second numerical aperture that is greater than the first numerical aperture.

In a specific preferred embodiment, the second numerical aperture is equal to or greater than 0.8.

An optical disk drive driving method according to the present invention is a method for driving an optical disk drive including an optical pickup with an objective lens for converging a light beam onto an optical disk. The method includes the steps of: getting the optical pickup displaced from an inner area of the optical disk toward an outer edge thereof in order to conduct a seek operation; and if the irradiated position of the light beam has passed the outer edge of the optical disk during the seek operation, getting the objective lens retracted away from the optical disk and getting the optical pickup displaced toward the inner area of the optical disk.

In an apparatus for controlling an optical disk drive according to the present invention, if the irradiated position of a light beam has been sensed to have passed the outer edge of an optical disk, an actuator in an optical pickup retracts an objective lens in the optical pickup away from the optical disk and displaces the optical pickup toward the inner area of the optical disk.

An other optical disk drive according to the present invention includes: an optical pickup including a light source that radiates a light beam to irradiate an optical disk, at least one objective lens for converging the light beam, and an actuator that is able to move the objective lens perpendicularly to the optical disk; transport means for displacing the optical pickup along the radius of the optical disk; sensing means for sensing if the irradiated position of the light beam has passed an outer edge of the optical disk while the optical pickup is being displaced from an inner area of the optical disk toward the outer edge thereof by the transport means to conduct a seek operation; and control means for getting the objective lens retracted away from the optical disk by the actuator and getting the optical pickup displaced toward the inner area of the optical disk by the transport means if the irradiated position of the light beam has been sensed to have passed the outer edge of the optical disk. If a disk with a diameter of 80 mm has been inserted using an adapter, the control means gets the objective lens retracted away from the optical disk by the actuator for a greater distance than a situation where a disk with a diameter of 120 mm is inserted.

In one preferred embodiment, if the disk with the diameter of 80 mm has been inserted, the control means sets the magnitude of the retraction greater than the situation where the disk with the diameter of 120 mm has been inserted, no matter whether the adapter is used or not.

Still another optical disk drive according to the present invention includes: an optical pickup including at least one light source that radiates a light beam to irradiate an optical disk, multiple objective lenses with mutually different numerical apertures, and an actuator that is able to move the objective lenses perpendicularly to the optical disk; transport means for displacing the optical pickup along the radius of the optical disk; sensing means for sensing whether or not at least a portion of the optical pickup faces a rim portion of the optical disk; and control means for getting the optical pickup displaced toward an inner area of the optical disk by the transport means such that if at least the portion of the optical pickup has been sensed to be located under the rim portion while focus ON processing is being carried out using one of the objective lenses that has a relatively low numerical aperture, the objective lens used for the focus ON processing and an objective lens that has a higher numerical aperture than the objective lens no longer face the rim portion.

In one preferred embodiment, the optical pickup includes a lens protecting member outside of the objective lens. If at least the portion of the optical pickup has been sensed to be facing the rim region, the control means gets the optical pickup displaced toward the inner area of the optical disk by the transport means such that the lens protecting member no longer faces the rim region.

Effects of the Invention

In an optical disk drive according to the present invention, in a situation where an optical pickup has passed the outer edge of an optical disk and starts to move back toward the inner area thereof while a seek operation is being carried out toward the outer edge of the optical disk, the objective lens makes a bypass so as to avoid a rim region and not to collide against the optical disk. Also, the optical disk drive of the present invention senses whether or not the optical pickup is facing a raised portion of the optical disk during a focus ON operation. If the answer is YES, the optical disk drive changes the positions of the optical pickup, thereby preventing the objective lens from colliding against the optical disk.

BRIEF DESCRIPTION OF DRAWINGS

Portion (a) of FIG. 1 schematically illustrates how the gap between an optical disk 100 and an objective lens 22 narrows gradually, portion (b) of FIG. 1 shows the waveform of a focus error (FE) signal, and portion (c) of FIG. 1 shows the waveform of a read (RE) signal.

Figure 1:
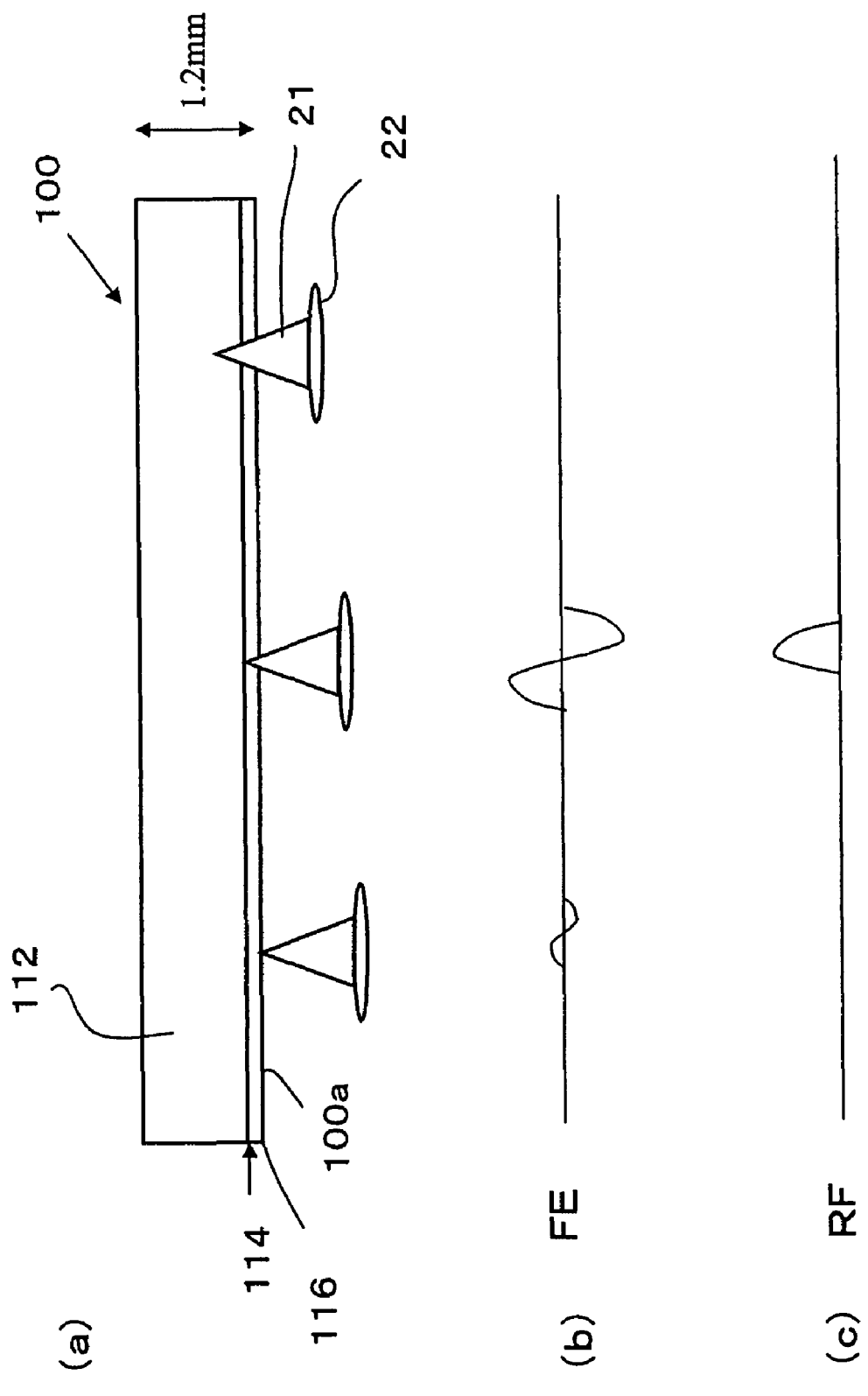
Figure 2:
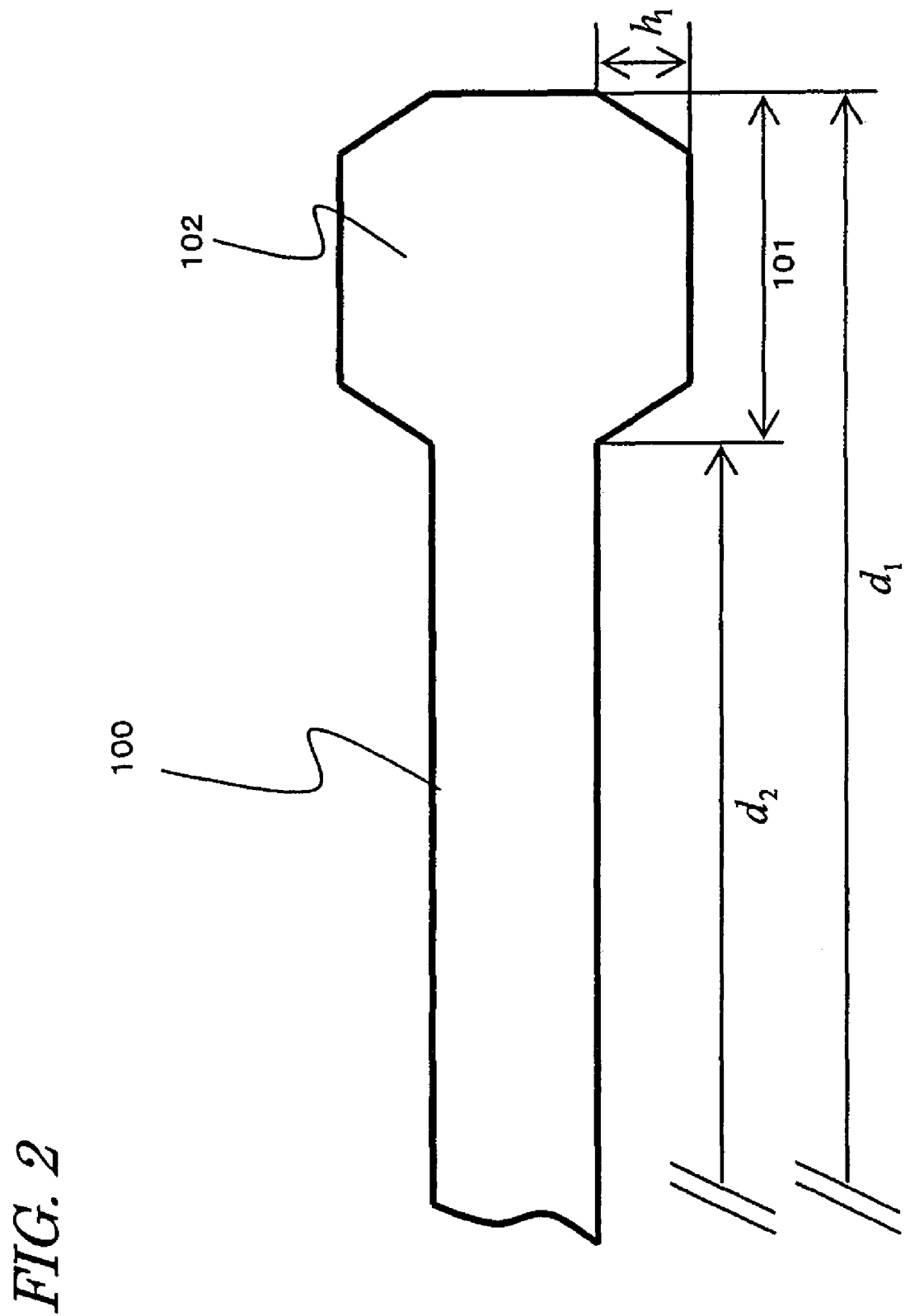
FIG. 2 illustrates the structure of a DVD-RAM as defined by Standard ECMA-330.
Figure 3:
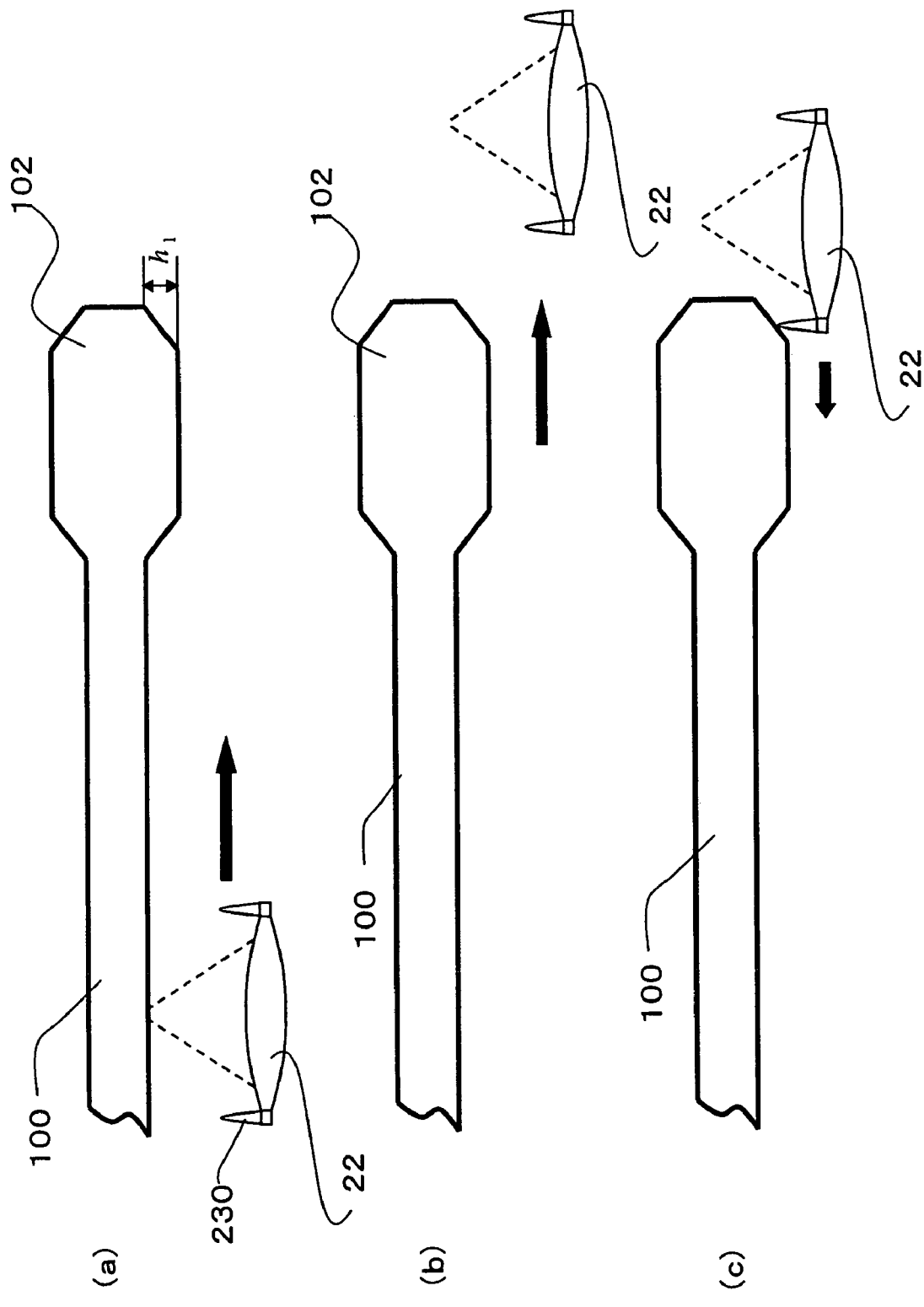
FIGS. 3(a) through 3(c) illustrate how an overrun happens in a conventional optical disk drive.

DESCRIPTION OF REFERENCE NUMERALS 1 optical disk
2 disk motor
3 rotation control section
4 rotational velocity detecting section
5 controller
6 optical pickup
7 red semiconductor laser
8 light beam (red)
9 objective lens (red)
10 red laser driving section
11 transport stage
13 transport control section
14 focus control section
15 tracking control section
16 photodetector
17 preamplifier
18 read signal processing section
19 seek control section
21 light beam (blue)
22 objective lens (blue)
23 blue semiconductor laser
24 blue laser driving section
30 rim detecting section
31 80 mm adapter detecting section
40 control section
100 optical disk
101 rim region
102 raised portion
150 adapter
230 lens protecting member

BEST MODE FOR CARRYING OUT THE INVENTION

First, a characteristic operation of an optical disk drive according to the present invention will be described with reference to FIGS. 6(a) through 6(c).

FIG. 6(a) schematically illustrates the displacement of an objective lens 22 during a seek operation. The objective lens 22 is supposed to move horizontally in FIG. 6(a) from the inner area of the optical disk 100 toward the outer edge thereof as the optical pickup is performing a traverse operation. When the beam spot of the light beam passes the outer edge of the optical disk 100 as shown in FIG. 6(b), sensing means senses that the "overrun" has happened and control means retracts the objective lens 22 away from the optical disk 100 (as pointed by the arrow A). After that, the optical pickup (not shown) is displaced toward the inner area of the optical disk 100 and the objective lens 22 is also displaced toward the inner area of the disk along with the optical pickup (as pointed by the arrow B).

Once the objective lens 22 has reached the inside of the space right under the raised portion 102 of the optical disk 100, the operation of moving the objective lens 22 toward the optical disk 100 for the purpose of focus ON processing is started (as pointed by the arrow C).

In this manner, if the overrun has happened, the optical disk drive of the present invention makes the objective lens 22 follow a bypass so as to avoid the raised portion 102 of the optical disk 100. That is why even if an objective lens with a high NA and a short focal length is used, the operation can be carried out with high reliability without allowing the objective lens to collide against the optical disk 100.

Figure 7:
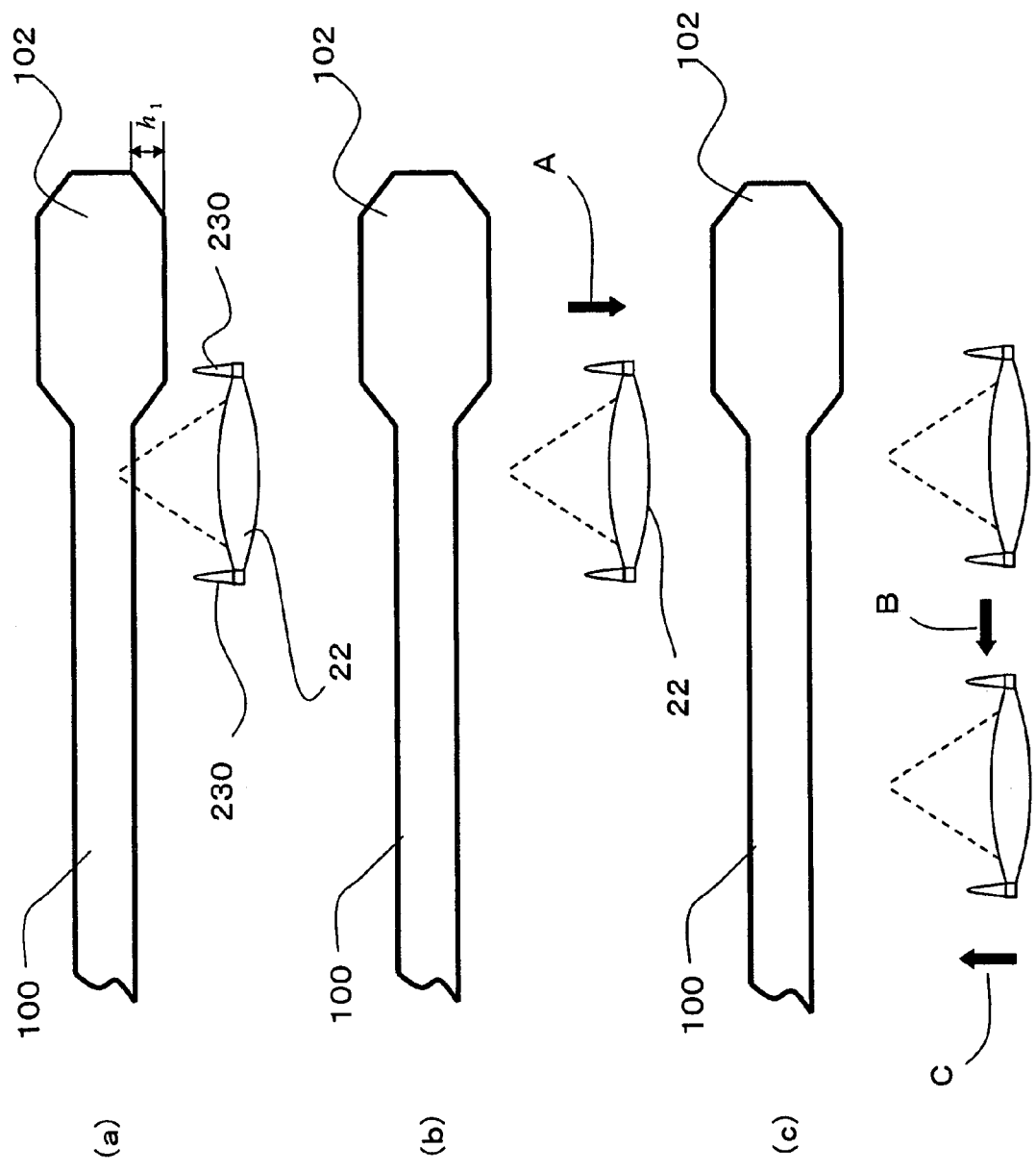
FIGS. 7(a) through 7(c) illustrate how defocusing occurs near the rim region of an optical disk in an optical disk drive according to the present invention.

In another preferred embodiment of the present invention, even if no overrun has happened, an appropriate bypass operation is also carried out. Specifically, if the focus servo has failed to work while a portion of the optical pickup (e.g., the lens protecting member 230) is facing the raised portion 102 as shown in FIG. 7(a), the objective lens 22 is retracted away from the optical disk 100 as pointed by the arrow A in FIG. 7(b) and then the displaced toward the inner area of the disk as pointed by the arrow B in FIG. 7(c). In this manner, even if the operation of moving the objective lens 22 toward the optical disk 100 as pointed by the arrow C is started after that for the purpose of focus search, the collision against the raised portion 102 of the optical disk 100 can still be avoided.

Hereinafter, preferred embodiments of the present invention will be described with reference to the accompanying drawings.

Embodiment 1

First, a First Preferred Embodiment of an Optical disk drive according to the present invention will be described with reference to FIG. 8, which shows a configuration for an optical disk drive according to this preferred embodiment.

The optical disk drive of this preferred embodiment is a three-wavelength multi drive that can read and write data from/on multiple types of optical disks. Examples of optical disks that can be handled according to this preferred embodiment include rewritable optical disks such as a Blu-ray Disc, a DVD-RW and a DVD-RAM and write-once optical disks such as a CD-R and a DVD-R. The diameter of the optical disk does not have to be 120 mm but may be 80 mm as well.

This optical disk drive includes a disk motor (such as a spindle motor) 2 that turns the optical disk 100, an optical pickup 6 for accessing a target track on the optical disk 100, and a control section 40 (enclosed within the dashed lines) for controlling the operations of the optical pickup 6 and the disk motor 2.

The disk motor 2 can turn the optical disk 100 at a predetermined rotational velocity (i.e., at predetermined revolutions per minute). The read/write methods of the optical disk 100 are classifiable into CLV methods (including a Zone CLV method), in which the read/write operation is performed at a constant linear velocity, and CAV methods (including a Zone CAV method), in which the read/write operation is performed at a constant angular velocity. Music, image information and so on are preferably read or written at a constant data transfer rate, and therefore, by the CLV method. In the CLV method, the read/write operation is performed at a constant linear velocity. Therefore, while the light beam is following inner tracks, the control is carried out such that the optical disk 100 is rotated at a high velocity. On the other hand, while the light beam is following outer tracks, the control is carried out such that the optical disk 100 is rotated at a low velocity. Meanwhile, in the Zone CLV method, the optical disk 100 is divided into multiple zones in the radial direction, and the control is carried out to keep the average linear velocity constant by making the rotational velocity constant within each of those zones but by varying the rotational velocities from one zone to another.

The rotational velocity of the optical disk 100 being turned by the disk motor 2 is controlled by a rotation control section 3 and the actual rotational velocity thereof is detected by a rotational velocity detecting section 4. The rotational velocity detecting section 4 sends a detection signal, showing the rotational velocity detected, to a controller 5.

The optical pickup 6 includes light sources (including a red semiconductor laser 7 and a blue semiconductor laser 23) for radiating multiple light beams 8 and 21 with different wavelengths, objective lenses 9 and 22 for converging the light beams 8 and 21, and a photodetector 16 for generating an electrical signal from at least a part of the light beam 8, 21 that has been reflected from the optical disk 100. The optical pickup 6 is supported on a transport stage 11. The optical disk drive of this preferred embodiment can also handle CDs. Thus, the optical pickup 6 further includes an infrared laser (not shown) that radiates an infrared light beam to irradiate a CD. However, the infrared laser is not shown for the sake of simplicity.

Figure 8:
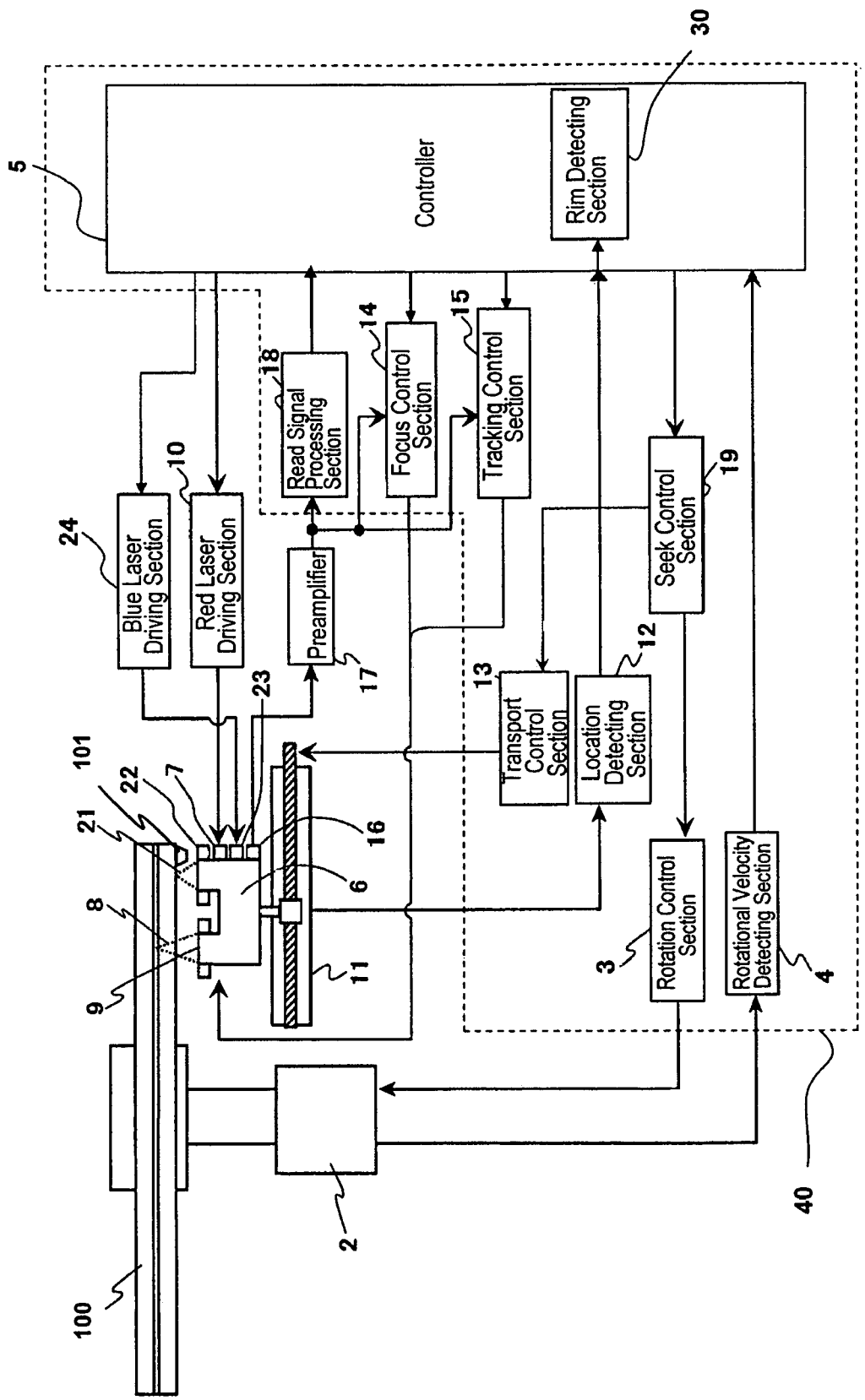
FIG. 8 is a block diagram illustrating a configuration for a preferred embodiment of an optical disk drive according to the present invention.
Figure 12:
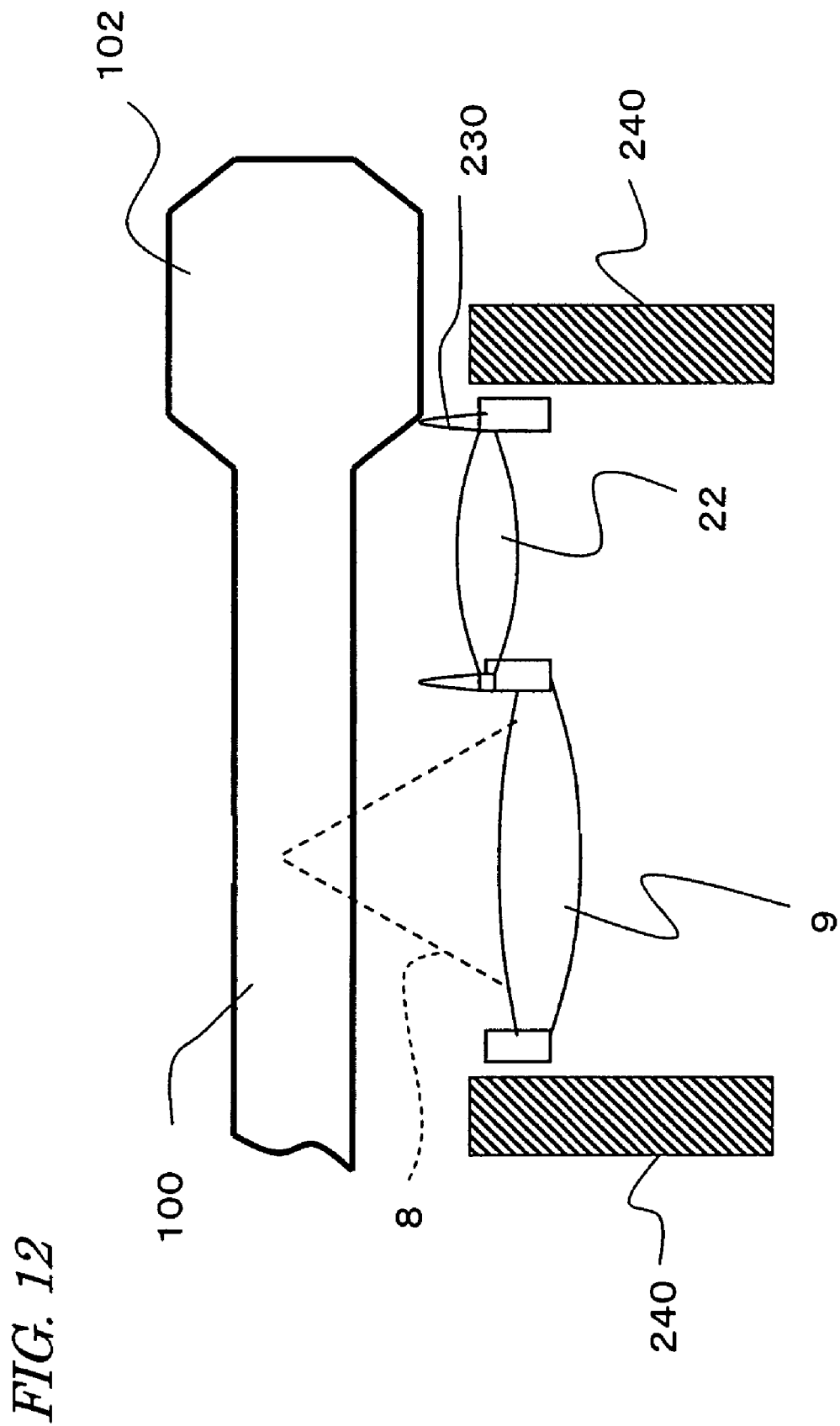
FIG. 12 illustrates how an objective lens 9 for DVDs and an objective lens 22 for BDs may be arranged.

Although not shown in FIG. 8, either, a lens protecting member such as the counterpart 230 shown in FIG. 12 is also provided for this optical pickup 6.

The red and blue lasers 7 and 23 as light sources are connected to a red laser driving section 10 and a blue laser driving section 24, respectively. The red laser driving section 10 controls the red semiconductor laser 7 such that the power of the red light beam 8 has an appropriate level for reading, writing or erasing. On the other hand, the blue laser driving section 24 controls the blue semiconductor laser 23 such that the power of the blue light beam 21 has an appropriate level for reading, writing or erasing.

The red light beam 8 is used to irradiate a DVD, while the blue light beam 21 is used to irradiate a BD. A CD is irradiated with an infrared light beam that has been radiated from an infrared laser (not shown). The infrared laser is controlled just like the other lasers.

The control section 40, of which the key component is the controller 5, controls the operations of the optical pickup 6, the disk motor 2 and other components, thereby performing a focus control operation and a tracking control operation. The respective functional blocks that form the control section 40 may be implemented either by hardware only or as a combination of hardware and software. At least a part of the control section 40 may be incorporated as a semiconductor integrated circuit component into the optical disk drive. The control section 40 may be either integrated together on a single semiconductor chip or separately arranged on a plurality of semiconductor chips. The operation of the control section 40 may be defined by the program stored in a memory of the optical disk drive. By modifying this program, the details of the operation of the control section 40 (i.e., a parameter such as the magnitude of vertical displacement of the lens) may be changed.

The controller 5 of this preferred embodiment includes a rim detecting section 30 that determines whether or not the optical pickup 6 is now facing the rim region 101 of the optical disk 100. The rim detecting section 30 can also determine whether overrun has happened or not.

The optical pickup 6 described above can make a traverse displacement in the disk radial direction by being transported by the transport stage 11 to be driven by a motor (not shown). The displacement of the transport stage 11 is controlled by a transport control section 13. When the optical disk 100 is loaded into the optical disk drive, the transport stage 11 usually moves the optical pickup 6 toward the innermost portion of the disk such that the focal point of the light beam is located on the innermost area (i.e., the management area) of the optical disk 100. To control the displacement of the optical pickup 6 quickly, the transport stage 11 preferably includes a linear motor.

The radial location of the light beam spot on the optical disk 100 (i.e., the point of incidence of the light beam) is roughly found by the transport stage 11 and then finely determined by a lens actuator in the optical pickup 6. As shown in FIG. 12, the objective lenses 9 and 22 are held together in the optical pickup 6 and are driven simultaneously by the lens actuator 240. That is why whenever the lens actuator that adjusts the position of the lens 9 operates while the optical disk 100 is being irradiated with the light beam 8, the position of the lens 22 also changes inevitably.

The radial location of the light beam spot on the optical disk 100 is detected by a location detecting section 12 that is attached to the transport stage 11. A detection signal representing the radial location detected is sent from the location detecting section 12 to the controller 5. The rim detecting section 30 of the controller 5 gets information about the radial location of the light beam spot from the signal supplied from the location detecting section 12, thereby determining whether or not the light beam spot is now located in the rim region 101 (i.e., whether or not the optical pickup 6 is now facing the rim region 101).

When the controller 5 sends a transport instruction, including the target location and preferred rotational velocity at the target location, to a seek control section 19, the seek control section 19 outputs a control signal, including an instruction to transport the optical pickup 6 to the target location, to the transport control section 13. At this time, to realize the preferred rotational velocity at the target location, a control signal including an instruction to change the rotational velocities of the disk motor 2 is supplied from the seek control section 19 to the rotational velocity control section 3, thereby controlling the displacement of the transport stage 11 and the rotational velocity of the disk motor 2.

A focus control section 14 gets the focal point of the light beam 8 or 21 located on the target information storage layer of the optical disk 100. A tracking control section 15 makes the focal point of the light beam 8 or 21 follow the target track. As a result of the focus control and tracking control, even while the optical disk 100 is rotating at a high velocity, the focal point of the light beam 8 or 21 can always follow the target track on the target information storage layer. The optical disk 100 causes some disk flutter while rotating, thus varying the distance between the optical pickup 6 and the optical disk 100. However, while the focus control is ON, the axial position of the objective lens 9 or 22 is finely adjusted by the actuator 240 (see FIG. 12) in the optical pickup 6 and the focal point of the light beam 8 or 21 can always be located right on the target information storage layer.

The light beam 8, 21 that has been reflected from the optical disk 100 is converted by the photodetector 16 into an electrical signal. This electrical signal is amplified by a preamplifier 17 and then passed to a read signal processing section 18 to decode information, to the focus control section 14 to feed back the focus error detected, and to the tracking control section 15 to feed back the tracking error detected, respectively. The read signal processing section 18 decodes the information included in the electrical signal, detects the intensity of the reflected light and then notifies the controller 5 of the results.

The focus control section 14 and the tracking control section 15 control the actuator 240 in the optical pickup 6 (see FIG. 12) so as to minimize the respective absolute values of the focus error signal and the tracking error signal, thereby adjusting the positions of the objective lenses 9, 22 (i.e., performing a servo control).

Hereinafter, it will be described with reference to FIG. 9 what processing is performed if the overrun happens during a seek operation.

Figure 9:
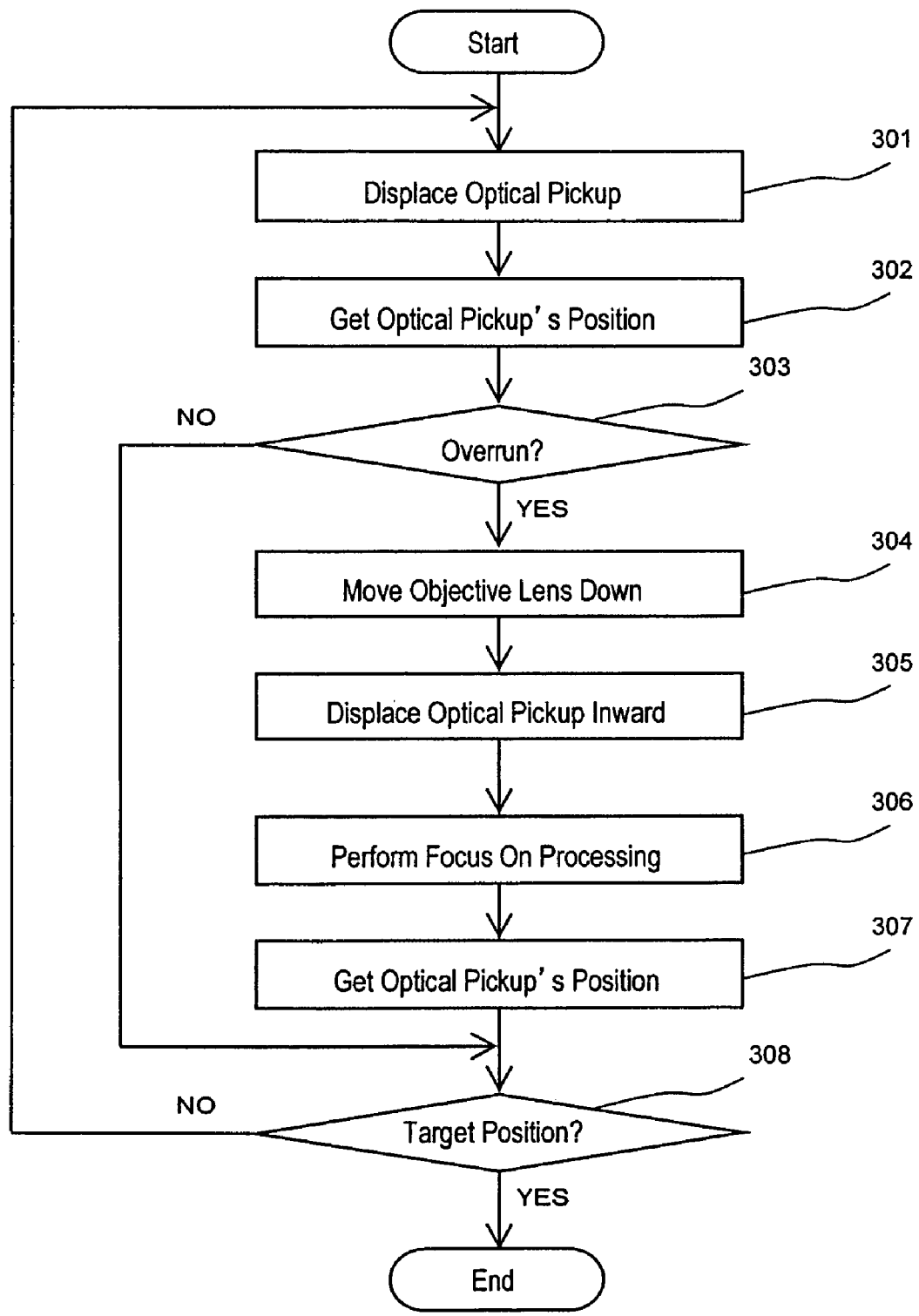
FIG. 9 is a flowchart showing the procedure of processing to be done in a first preferred embodiment of the present invention.

First, in Step 301 shown in FIG. 9, the optical pickup 6 is displaced by the transport stage 11 toward the outer edge of the optical disk 100 to conduct a seek operation. Next, in Step 302, the location detecting section 12 gets the position of the optical pickup 6 from the transport stage 11. The position of the optical pickup 6 may be determined based on the output of the location detecting section 12. If the transport stage 11 is driven by a stepping motor, then the position of the optical pickup 6 may be determined by getting the drive pulses of the stepping motor counted by the location detecting section 12. On the other hand, if the transport stage 11 is driven by a DC motor, then the position of the optical pickup 6 may be determined by getting the drive pulses of a linear encoder, for example, counted by the location detecting section 12. Optionally, the position of the optical pickup, corresponding to the location of the light beam spot, may be determined based on the address that has been acquired in advance from the optical disk 100.

Next, in Step 303, by reference to the position of the optical pickup 6 that has been determined in Step 302, the rim detecting section 30 determines whether or not an overrun has happened. If the answer is YES, the process advances to Step 304. Otherwise, the process jumps to Step 308. In Step 303, as to whether the overrun has happened or not, it may be determined by one of the following two methods.

(1) It may be determined, by reference to the information about the radial location of the optical pickup 6, whether or not the overrun has happened. For example, if the position of the optical pickup 6 is outside of a radial location of 58.5 mm, then it may be determined that the overrun has happened. In this case, the radial location of 58.5 mm corresponds to the radial location of the rim region on the outer edge of the optical disk 100 when the disk 100 is a BD with a diameter of 120 mm. Also, the "position of the optical pickup" corresponds to the radial location of the center of the objective lens being used to converge the light beam: or (2) It may be determined that the overrun has happened if the intensity of the reflected light, detected by the read signal processing section 18, is equal to or lower than a predetermined level (e.g., 50% or less of the intensity of the reflected light while the servo control is being carried out).

Figure 4:
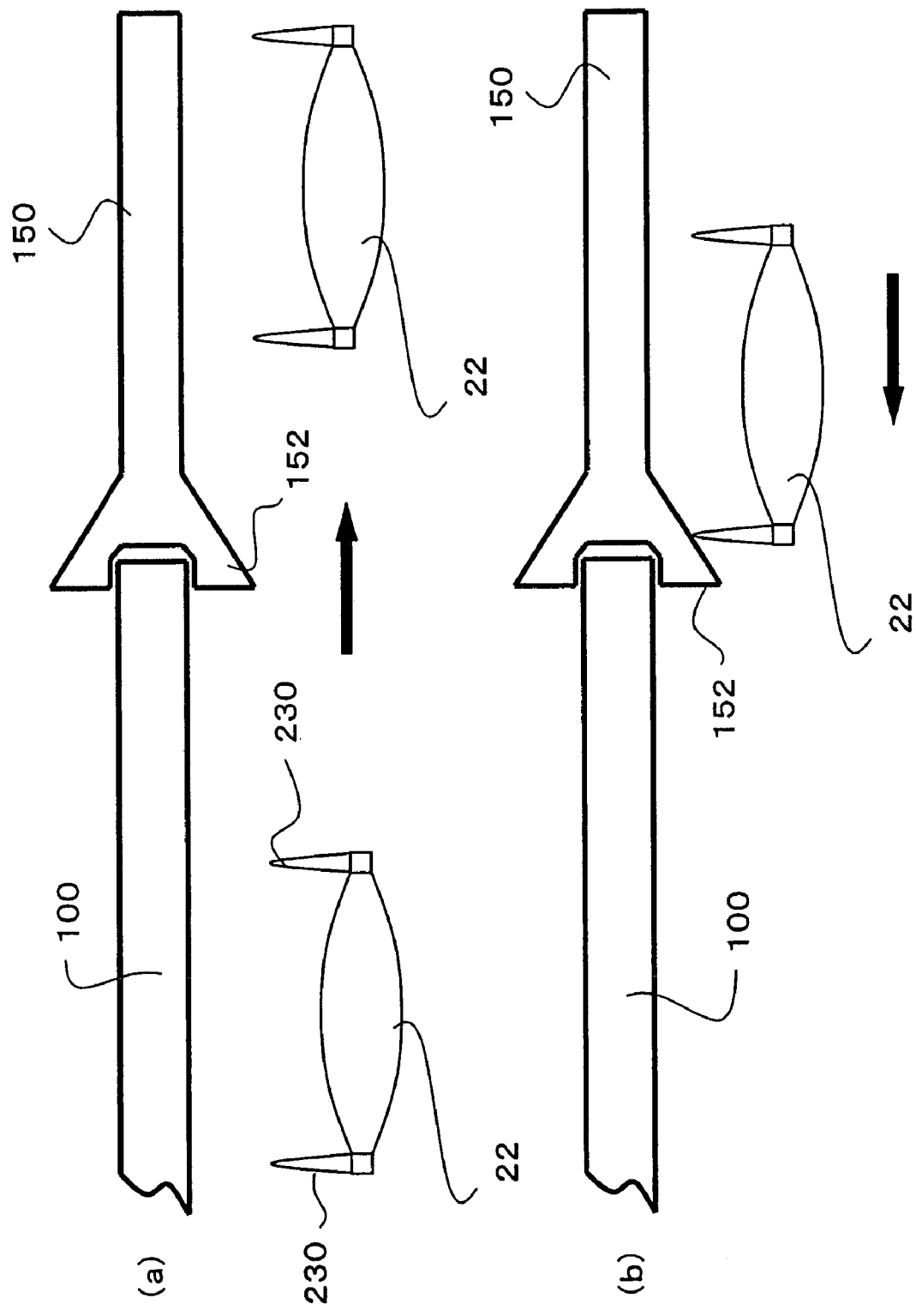
FIGS. 4(a) and 4(b) illustrate how an overrun happens during a seek operation in a situation where a disk with a diameter of 80 mm has been loaded into a conventional optical disk drive using an adapter.
Figure 5:
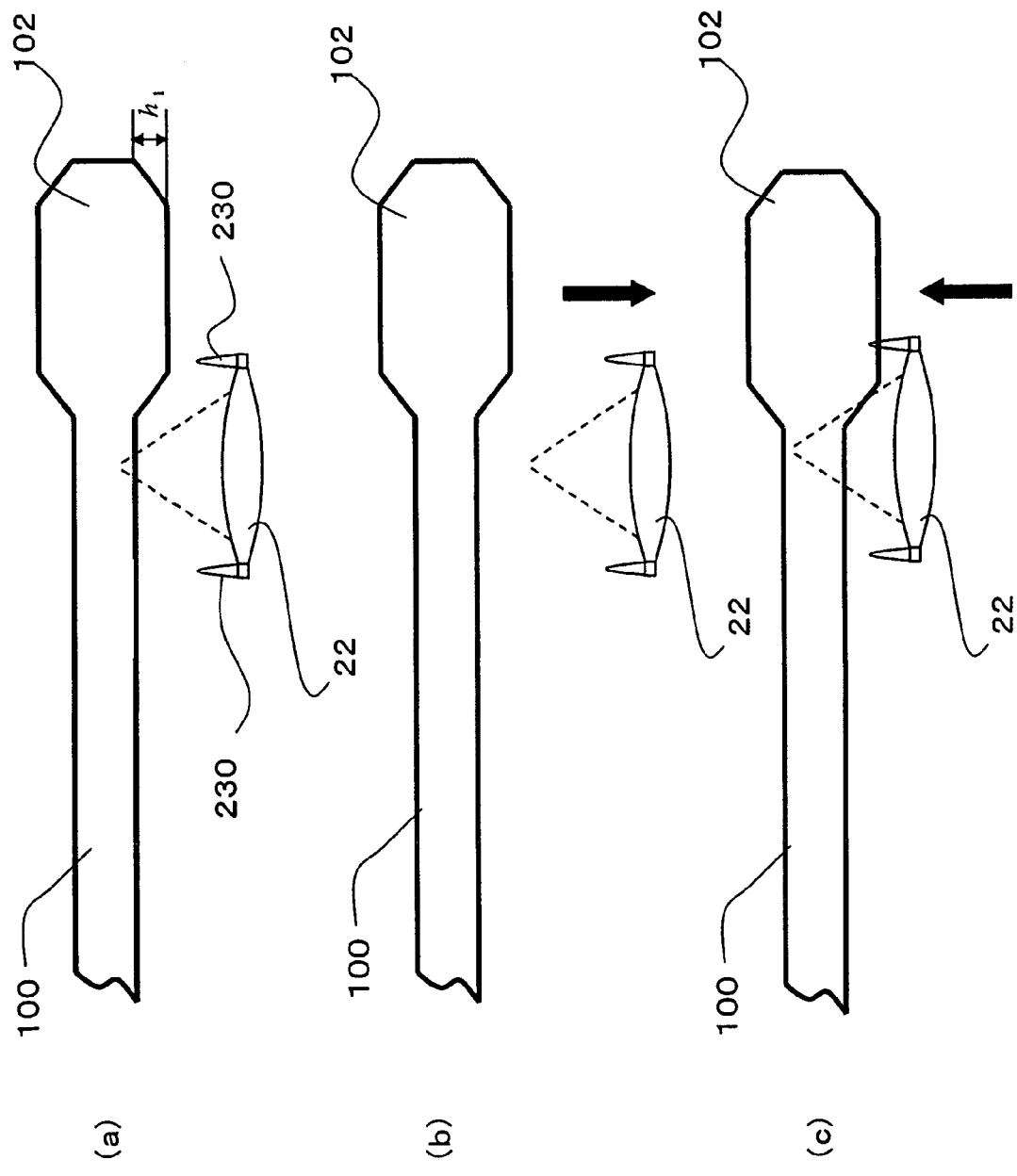
FIGS. 5(a) through 5(c) illustrate how defocusing occurs near a rim region in a conventional optical disk drive.

Next, in Step 304, the lens actuator 240 moves (i.e., retracts) the objective lens 9 or 22 away from the optical disk 100 (as pointed by the arrow A in FIG. 6(b)). The magnitude of this movement (i.e., the magnitude of vertical displacement of the lens=the magnitude of retraction) is set such that the objective lens 9 or 22 does not collide against the rim region 101 of the optical disk 100. More specifically, the magnitude of the displacement is determined by adding a margin that considers the magnitude of the out-of-plane vibrations (i.e., the disk flutter) of the optical disk 100 to the maximum height of the rim region 101 (e.g., 0.2 mm). If the optical disk 100 has a diameter of 120 mm, the magnitude of the out-of-plane vibrations in the rim region 101 may be about 0.3 mm, for example. On the other hand, if the optical disk 100 has a diameter of 80 mm, the magnitude of the out-of-plane vibrations in the rim region 101 may be about 0.2 mm, for example. Since the magnitude of the out-of-plane vibrations changes with the size of the optical disk 100 in this manner, the magnitude of retraction of the objective lens may be changed according to the size of the optical disk, for example. Specifically, if the optical disk 100 has a diameter of 120 mm, the magnitude of retraction of the objective lens may be set to 0.5 mm. On the other hand, if the optical disk 100 has a diameter of 80 mm, the magnitude of retraction of the objective lens may be set to 0.4 mm. Also, in an 80 mm disk fitted into an adapter, the height of the protrusion 152 (see FIG. 4) of 0.5 mm, for example, is greater than that of the rim region 101. Thus, in that case, the magnitude of retraction of the objective lens may be 0.9 mm, which is the sum of the height of the protrusion 152 and the magnitude of the out-of-plane vibrations. If the lens protecting member 230 is provided, however, the magnitude of retraction is preferably determined with the height (of 20 μm to 70 μm, for example) of the portion of the lens protecting member 230 that sticks out of the objective lens 22 taken into account as well. This should be done such that the lens protecting member 230 never collides against the rim region 101 or the adapter when the optical pickup 6 is displaced toward the inner area of the optical disk 100.

Subsequently, in Step 305, the optical pickup 6 is displaced by the transport stage 11 toward the inner area of the optical disk 100 in the radial direction (as pointed by the arrow B in FIG. 6(*b*)). The magnitude of this displacement is determined such that the optical pickup 6 is located inside of the radial location of the rim region 101. The range of the rim region 101 may be defined by adding a margin to be determined by the step width of the transport stage 11 to the actual radial size (or width) of the rim region 101 on the optical disk 100.

The optical pickup 6 may be displaced to any location as long as the location is inside of the rim region 101. However, if the optical pickup 6 is displaced to a location close to the target track of the seek operation, then the time it takes to reach the target track can be shortened. It should be noted that before the displacement of the objective lens as pointed by the arrow A is finished, the displacement (or traverse) as pointed by the arrow B may be started.

Figure 6:
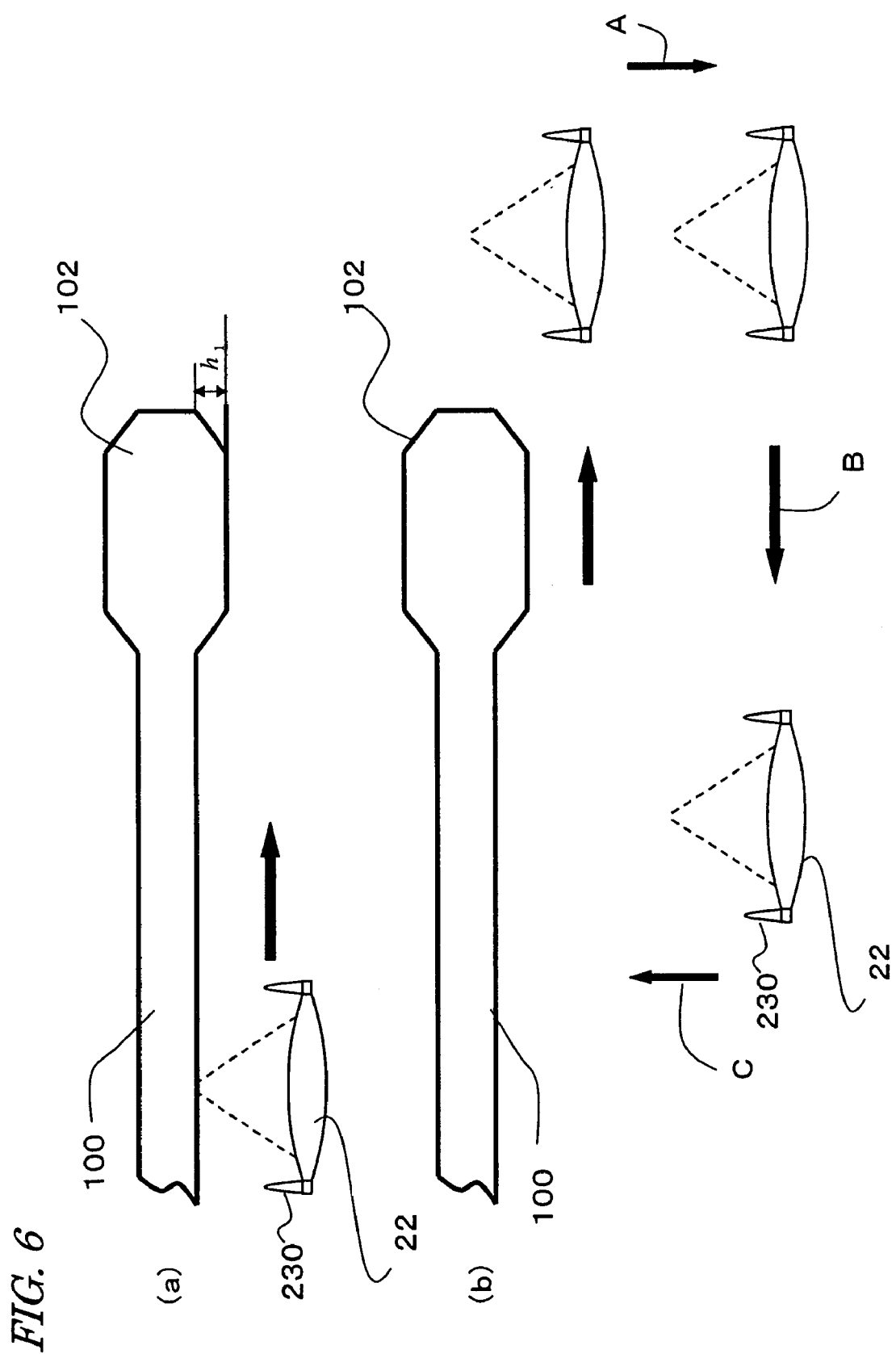
FIGS. 6(a) and 6(b) illustrate how an overrun happens during a seek operation in an optical disk drive according to the present invention.

Thereafter, in Step 306, focus ON processing is carried out by getting the focus control section 14 to move the objective lens 9 or 22 toward the optical disk 100 (as pointed by the arrow C in FIG. 6(*b*)). Since the focus ON processing is carried out just as described above, the description thereof will be omitted herein.

Then, in Step 307, the position of the optical pickup 6 is detected by the same method as that adopted in Step 302. Next, in Step 308, it is determined whether or not the position of the optical pickup 6 that has been detected in Step 302 or 307 corresponds with the location of the target track. If the answer is YES, the seek processing ends. Otherwise, the process goes back to the processing step S301 to perform the same series of processing steps all over again.

Optionally, the seek processing may be ended if the address that has been detected in Step 307 for the current position of the optical pickup is found matching the target address in Step 308.

When the optical pickup 6 is displaced from the inner area of the optical disk toward the outer edge thereof during a seek operation, the rim detecting section 30 of this preferred embodiment functions as sensing means for seeing if the beam spot of the light beam has passed the outer edge of the optical disk.

Embodiment 2

Hereinafter, a second preferred embodiment of an optical disk drive according to the present invention will be described with reference to FIG. 10. The optical disk drive of this preferred embodiment has the same basic configuration as the counterpart shown in FIG. 8 but operates following a different processing flow.

As described above, as long as the focus control is being carried out, the focal point of the light beam 8 or 21 can always keep up with the target information storage layer even while the optical disk 100 is rotating at a high velocity. However, the focus servo may sometimes fail to work due to presence of some scratch or dust on the optical disk 100 or some impact that has been externally applied from outside of the drive. In that case, an operation to resume the focus control (which will be referred to herein as a "retry operation") needs to be carried out. The preferred embodiment to be described below is a method of performing a retry operation when the focus servo fails due to some factor other than the overrun. In the following description, the optical pickup 6 is supposed to include only one objective lens (e.g., the objective lens 22 for BDs) in the first example for the sake of simplicity.

Figure 10:
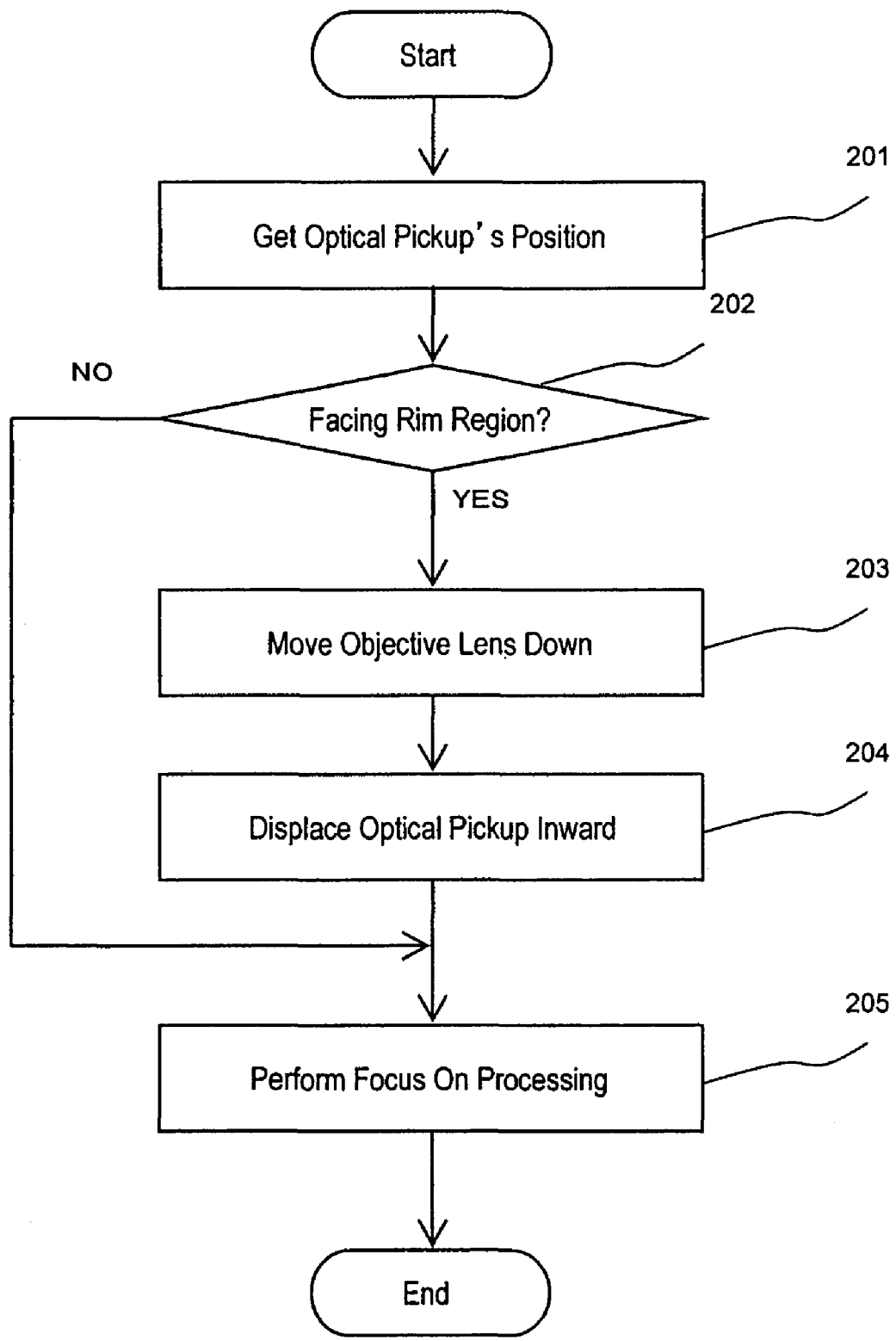
FIG. 10 is a flowchart showing the procedure of processing to be done in a second preferred embodiment of the present invention.

First, in Step 201 shown in FIG. 10, the current position of the optical pickup 6 is gotten. The position of the optical pickup 6 is gotten by the same method as that already described for the first preferred embodiment, and the description thereof will be omitted herein.

Next, in Step 202, by reference to the position of the optical pickup 6 that has been gotten in Step 201, the rim detecting section 30 determines whether or not the objective lens 22 is now located at such a position as to face the rim region 101 of the optical disk 100. If the answer is YES, the process advances to Step 203. Otherwise, the process jumps to Step 205. More specifically, if it is discovered, by reference to the information about the position of the optical pickup 6 (i.e., information representing its disk radial location), that the sum of the disk radial location of the center of the objective lens 22 and the radius of the lens falls within a disk radial location range of 58.5 mm to 60.0 mm, for example, then it is determined that the objective lens 22 is now located at such a position as to face the rim region 101. In this case, the disk radial location range of 58.5 mm to 60.0 mm corresponds to the rim region 101 of the optical disk 100 when the disk is a BD with a diameter of 120 mm.

Next, in Step 203, the lens actuator 240 (see FIG. 12) moves (i.e., retracts) the objective lens 9 or 22 away from the optical disk 100. As in the first preferred embodiment described above, the magnitude of retraction (i.e., the magnitude of vertical displacement of the lens) is set such that the objective lens 9 or 22 does not collide against the rim region 101 of the optical disk 100. That is why this magnitude of retraction is preferably changed according to the radial location of the rim region 101 (i.e., the diameter of the optical disk 100).

Next, in Step 204, the optical pickup 6 is displaced by the transport stage 11 toward the inner area of the optical disk 100 in the radial direction. The magnitude of this displacement (i.e., the magnitude of horizontal displacement) is determined such that the outer edge of the objective lens 22 is located inside of the radial location of the rim region 101. That is to say, the magnitude of the horizontal displacement of the optical pickup 6 is determined such that the sum of the radial location of the center of the objective lens 22 and the radius of the lens becomes smaller than the radial location of the rim region 101. To avoid the collision with the rim region 101, the magnitude of the horizontal displacement of the optical pickup 6 is preferably increased. However, to shorten the time it takes to resume the read/write operation, the focus ON processing is preferably carried out near the location of the light beam spot when the focus servo fails to work. Consequently, the optical pickup 6 is preferably displaced to a location that is as close to the previous location, defined by the address that was gotten before the focus servo has failed, as possible while satisfying the condition that the outer edge of the objective lens 22 is located inside of the rim region 101.

The magnitude of the horizontal inward displacement of the optical pickup 6 is preferably determined with the eccentricity of the disk taken into account. Considering the width (of 1.5 mm, for example) of the rim region 101, the eccentricity (of 37.5 µm, for example) of the disk, the axial displacement (of 50 µm, for example) of the spindle motor and the radius (of 1 mm to 1.6 mm, for example) of the lens, the magnitude of the horizontal displacement is preferably greater than the sum of these numerical values.

In the example described above, the optical pickup 6 is supposed to include only one objective Lens 22. In the example to be described below, the optical pickup 6 includes an objective lens 9 for DVDs as well as the objective lens 22 for BDs.

Figure 13:
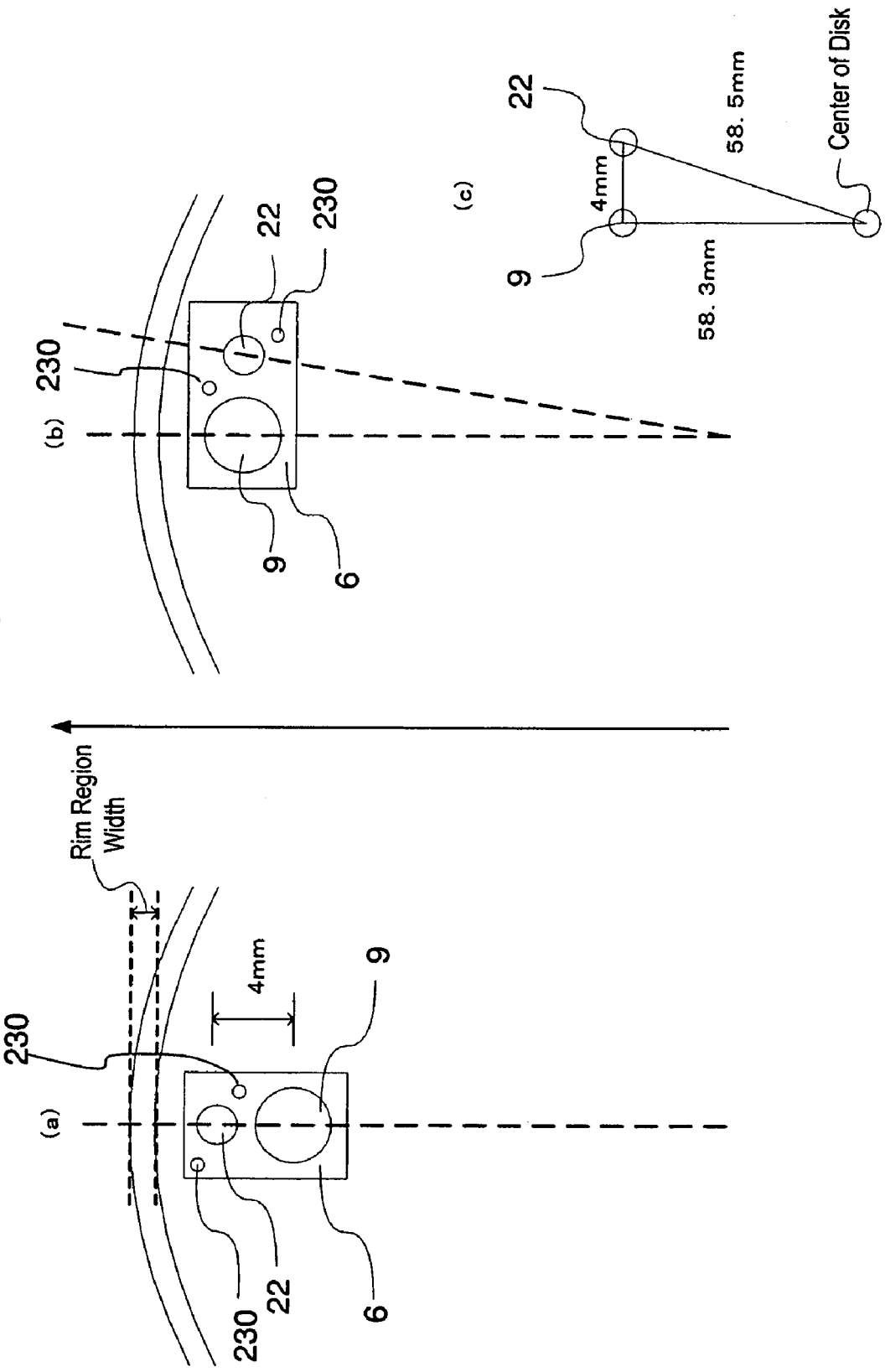
FIG. 13 illustrates how an objective lens 9 for DVDs and an objective lens 22 for BDs may be arranged with respect to an optical disk 100.

The objective lens 9 for DVDs (which will be referred to herein as the "DVD objective lens 9") and the objective lens 22 for BDs (which will be referred to herein as the "BD objective lens 22") may have two quite different arrangements in the optical pickup 6 as shown in FIGS. 13(a) and 13(b). Suppose the two objective lenses 9 and 22 are arranged in the radial direction of the optical disk 100 and if the BD objective lens 22 is located closer to the outer edge of the disk as shown in FIG. 13(a). In that case, even while a DVD is being irradiated with a light beam that has been converged by the DVD objective lens 9, the BD objective lens 22 that is not being used may collide against the rim 102 as is clear from FIG. 12. That is why when the objective lenses 9, 22 are moved toward the optical disk 100 to start the focus ON processing after the focus servo has failed for some reason and the optical pickup 6 has been moved away from the optical disk 100 for retraction purposes, the optical pickup 6 needs to have been displaced horizontally to a position where the BD objective lens 22 never collides against the rim 102.

As to how long the optical pickup needs to be displaced horizontally (i.e., the magnitude of the horizontal displacement), a portion of the optical pickup 6 that is likely to collide against the rim 102 of the optical disk 100 (which will be referred to herein as an "unsafe portion") is preferably located and the magnitude of the horizontal displacement is preferably determined such that the unsafe portion is located inside of the rim region 101.

If the BD objective lens 22 is arranged closer to the outer edge of the disk than the DVD objective lens 9 is in the optical pickup 6, then the magnitude of the horizontal displacement that was determined in view of the disk eccentricity and so on while a DVD was being accessed using the DVD objective lens 9 is preferably corrected with the arrangement of the objective lenses 9 and 22 taken into consideration.

In the arrangement shown in FIG. 13(a), the quantity of this correction is defined by the difference between the radial locations of the respective outermost portions of the objective lenses 9 and 22.

Next, suppose the two objective lenses 9 and 22 are arranged side by side in the circumferential direction of the optical disk 100 as shown in FIG. 13(b). In that case, even if the center of the DVD objective lens 9 is located inside of the rim region 101, the center of the BD objective lens 22 may be located within the rim region 101. In the example shown in FIG. 13(c), the center of the DVD objective lens 9 is arranged at a radial location of 58.3 mm and that of the BD objective lens 22 is arranged at a radial location of 58.5 mm. In this case, however, the radius of the BD objective lens 22 is smaller than that of the DVD objective lens 9. Thus, if the outermost portion of the DVD objective lens 9 is located inside of the rim region 101, then that of the BD objective lens 22 is also located inside of the rim region 101. That is why the arrangement shown in FIG. 13(b) is more advantageous over that shown in FIG. 13(a) in that collision between the BD objective lens 22 and the rim 102 can be avoidable more easily.

Next, it will be described how to avoid the collision between the lens protecting member 230 and the rim 102. The lens protecting member 230 is made of an elastic material such as silicone resin and is arranged near the BD objective lens 22. As shown in FIGS. 13(a) and 13(b), the lens protecting member 230 may sometimes be arranged closer to the outer edge of the disk than the objective lenses 9 and 22 are. In that case, the magnitude of the horizontal displacement is preferably corrected with the location of the lens protecting member 230 taken into account as well. For example, if the focus servo fails to work while a DVD is being accessed using the DVD objective lens 9, then the quantity of correction may be the distance from the radial location of the outermost portion of the DVD objective lens 9 to the lens protecting member 230.

Thereafter, in Step 205, focus ON processing is carried out. Considering that the focus servo may have failed due to the presence of some scratch or dust on the optical disk 100, the failure may not be resolved just by displacing the optical pickup 6 horizontally such that the objective lens 22 and the lens protecting member 230 are located inside of located within a region where such scratch or dust is present on the optical disk 100. In that case, the focus ON processing may be started after the optical pickup 6 has been displaced either inward or outward in the disk radial direction for at least a distance corresponding to the size of the scratch or dust (e.g., 5 mm).

It should be noted that the rim region 101 is usually located on the outermost area of the optical disk 100. That is why a switch that can sense the optical pickup 6 reach the outermost area of the optical disk 100 could also sense the optical pickup 6 reach the rim region 101.

As described above, according to this preferred embodiment, on sensing that the optical pickup 6 is located in an area where the optical pickup may possibly collide against the rim 102 before starting the focus ON processing, the optical pickup 6 is displaced toward the inner area of the disk to avoid the collision. As a result, it is possible to prevent the optical disk 100 and the objective lens from getting scratched or damaged.

Suppose the DVD objective lens 9 and the BD objective lens 22 are arranged in the radial direction of the optical disk 100 but the DVD objective lens 9 is located closer to the outer edge of the disk than the BD objective lens 22 is. In that case, if the outermost area of a BD is accessed using the BD objective lens 22, the DVD objective lens 9 may face the rim region 101. However, the DVD objective lens 9 has a greater focal length, is arranged more distant from the optical disk 100, and therefore, is less likely to collide against the rim region 102 during the focus ON operation.

Embodiment 3

Figure 11:
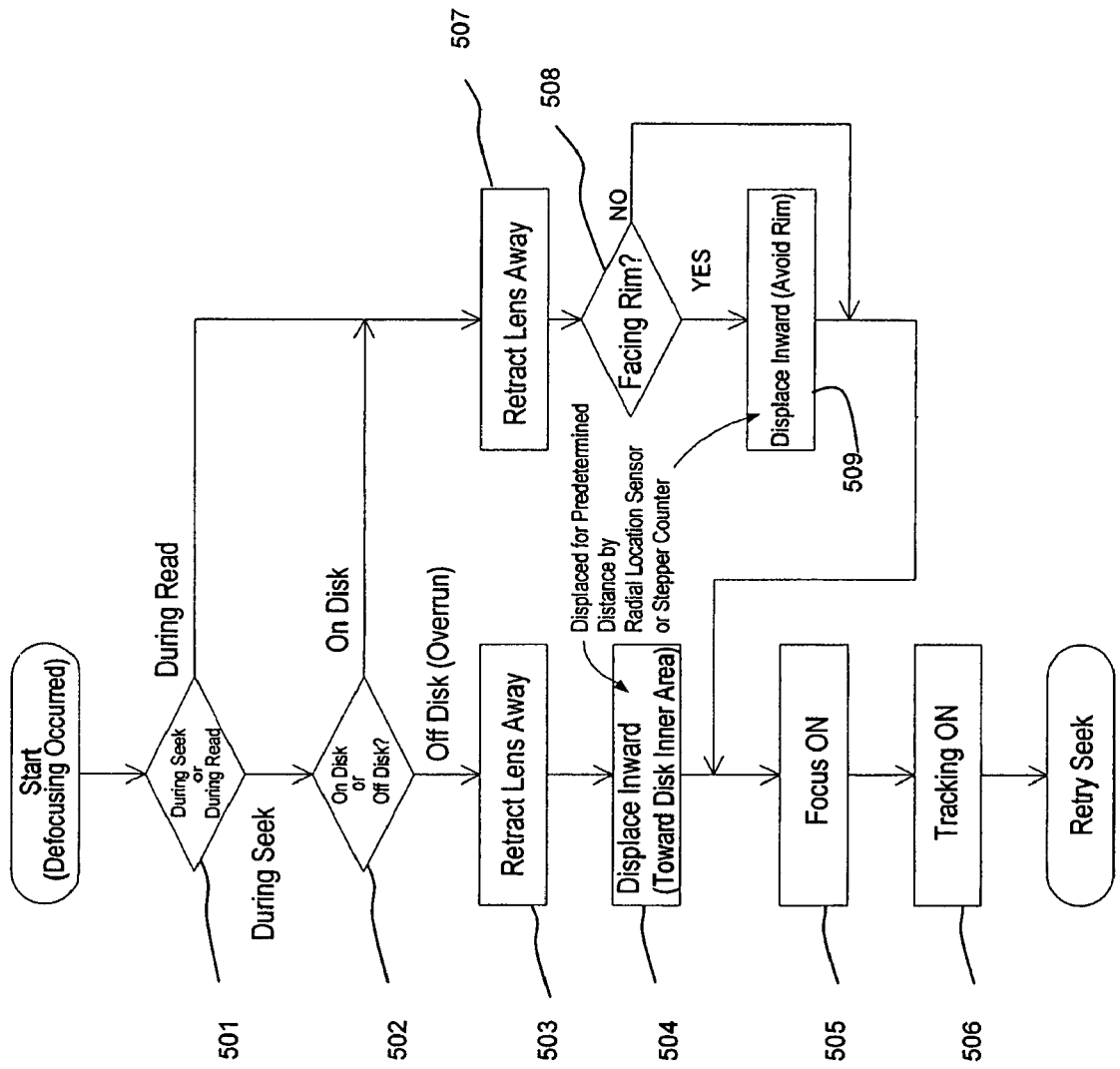
FIG. 11 is a flowchart showing the procedure of processing to be done in a third preferred embodiment of the present invention.

Hereinafter, a third preferred embodiment of an optical disk drive according to the present invention will be described with reference to FIG. 11. The optical disk drive of this preferred embodiment also has the configuration shown in FIG. 8.

Suppose defocusing has occurred either while data is being read from the optical disk 100 (i.e., during a read operation) or while the light beam spot is being shifted outward from the inner area of the disk toward the outer edge thereof (i.e., during a seek operation).

First, in Step 501, it is determined whether the defocusing has occurred during the read operation or during the seek operation. If the defocusing has occurred during the read operation, the process jumps to Step 507. On the other hand, if it has occurred during the seek operation, then the process advances to Step 502. The defocusing may have occurred during the seek operation either due to the overrun (i.e., because the light beam spot has passed the outer edge of the optical disk 100) or for other reasons. This difference may be expressed as whether the light beam spot is located on or off the optical disk 100.

Next, in Step 502, it is determined whether the light beam spot is located on or off the optical disk 100. If the light beam spot is located off the optical disk 100, then it is determined that the overrun has happened and the process advances to Step 503, in which the objective lenses are moved away from the optical disk 1. More specifically, the objective lenses 9 and 22 are retracted by the lens actuator away from the optical disk 100.

After the optical pickup 6 has been moved far enough to avoid colliding against the rim region 101 of the optical disk 100 as a result of the displacement of the lenses described above, the optical pickup is displaced toward the inner area of the optical disk 100 in Step 504. In this case, the position of the optical pickup 6 may be determined based on the output of the location detecting section 12. If the transport stage 11 is driven by a stepping motor, then the position of the optical pickup 6 may be determined by counting the drive pulses of the stepping motor. On the other hand, if the transport stage 11 is driven by a DC motor, then the position of the optical pickup 6 may be determined by counting the drive pulses of a linear encoder, for example. If the unsafe portion that is likely to collide against the rim region 101 is located closer to the outer edge of the disk than the objective lens being used actually is as in the second preferred embodiment described above, then the optical pickup 6 is preferably displaced for the distance plus the quantity of correction.

After the optical pickup 6 has been displaced horizontally (i.e., has made a traverse displacement) in this manner to such a position where the optical pickup 6 can avoid colliding against the rim region 101 of the optical disk 100 even if the objective lenses 9 and 22 approach the optical disk 100, focus ON processing is started in Step 505. Once the focus ON processing has been started, the objective lenses 9 and 22 are moved toward the optical disk 100 in search of the target information storage layer (i.e., focus search is started). When the focus finding operation is completed by shifting the focal point of the light beam close to the target information storage layer as a result of the focus search (i.e., when the servo control has been turned ON), the tracking control is started in Step 506. Thereafter, the seek operation is retried in search of the target track.

If it has been determined in Step 501 that the defocusing occurred during the read operation or if it has been determined in Step 502 that no overrun happened even during the seek operation, then the process advances to Step 507, in which the objective lenses 9 and 22 are displaced away from the optical disk 100.

Next, in Step 508, it is determined whether or not the optical pickup 6 is now located at such a position as to face the rim region 101 and its surrounding area. The position of the optical pickup 6 may be determined based on the output of the location detecting section 12.

If the answer to the query of Step 508 is YES, the optical pickup 6 is displaced toward the inner area of the optical disk 100 in Step 509 to prevent the optical pickup 6 from colliding against the rim region 101 of the optical disk 100 during the focus ON processing to be performed next. On the other hand, if the answer to the query of Step 508 is NO, then the process advances to Step 505. The detection range of the rim region 101 may be defined by adding a margin to be determined by the step width of the transport stage 11 to the actual radial size (or width) of the rim region 101 on the optical disk 100.

Depending on whether the operation that was being performed when the defocusing occurred was read operation or seek operation, the optical disk drive of this preferred embodiment carries out a more appropriate type of processing, thereby preventing the optical pickup 6 from colliding against the optical disk 100 when the focus servo control is started all over again.

In the preferred embodiments described above, since the DVD objective lens 9 has a greater focal length than the BD objective lens 22, the DVD objective lens 9 is arranged more distant from the optical disk 100 than the BD objective lens 22 is as shown in FIG. 12. However, these objective lenses 9 and 22 are driven together by the actuator 240. That is why even while data is being read from, or written on, a DVD using the objective lens 9, the working distance is still defined by the BD objective lens 22 or the lens protecting member 230, which may collide against the raised portion 102 of the optical disk 100 as described above. For that reason, if the optical pickup includes both the DVD objective lens 9 and the BD objective lens 22, it is effective to perform the rim avoiding processing of the present invention even while a read/write operation is being performed on a DVD.

Embodiment 4

Figure 14:
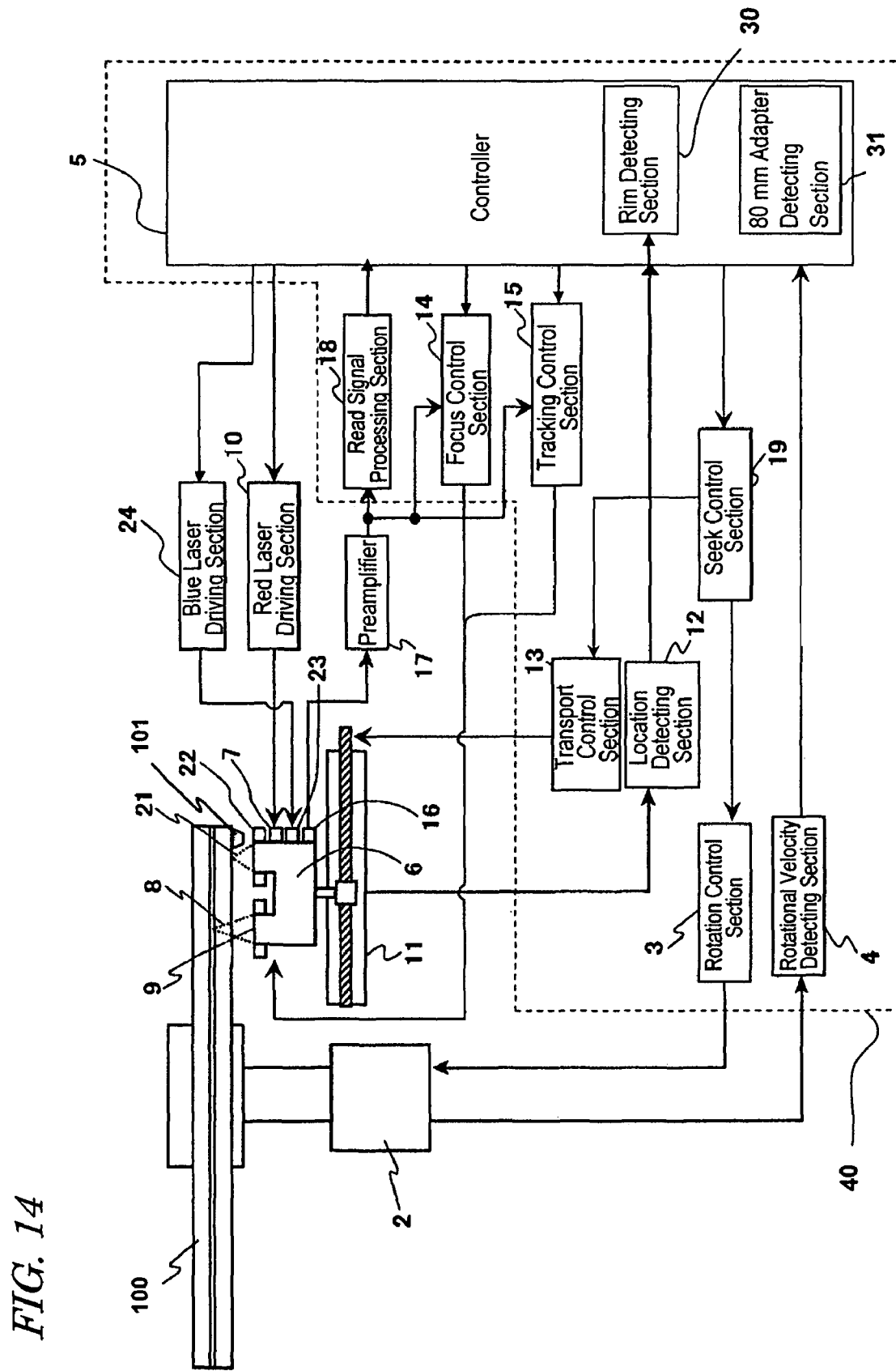
FIG. 14 is a block diagram showing a configuration for an optical disk drive according to a fourth preferred embodiment of the present invention.

Hereinafter, a fourth preferred embodiment of an optical disk drive according to the present invention will be described with reference to FIG. 14, which shows a Configuration for an optical disk drive according to this preferred embodiment. If any of the components of the optical disk drive shown in FIG. 14 has the same function as the counterpart shown in FIG. 8, that pair of components will be identified by the same reference numeral and the description thereof will be omitted herein.

The optical disk drive of this preferred embodiment includes not only all components of the optical disk drive of the preferred embodiments described above but also an 80 mm adapter detecting section 31.

The 80 mm adapter detecting section 31 determines whether the optical disk 100 that has been loaded into the optical disk drive is a disk with a diameter of 80 mm that has been fitted into an 80 mm adapter or a disk with a diameter of 120 mm.

Figure 15:
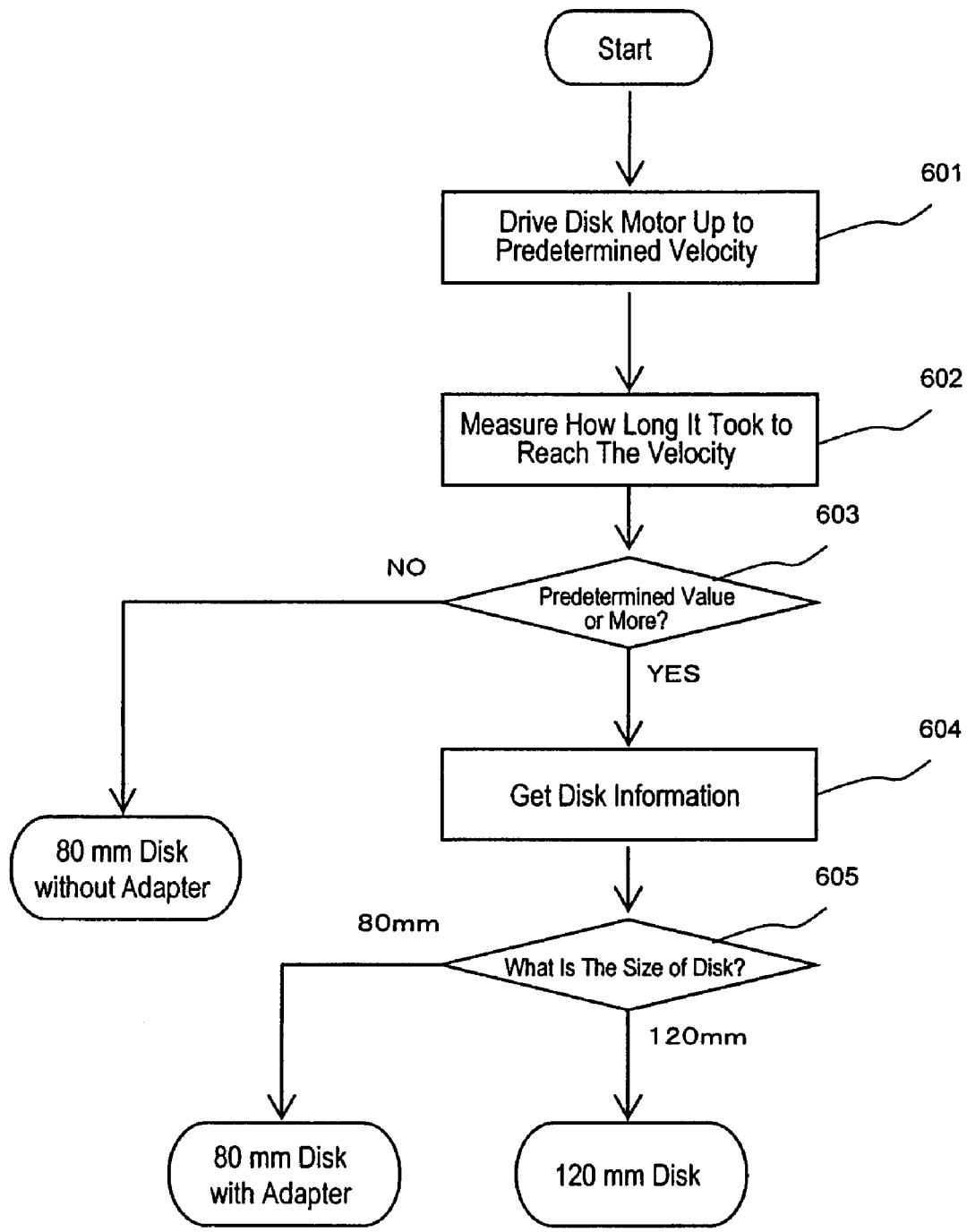
FIG. 15 is a flowchart showing how to detect an adapter for 80 mm disks.

Hereinafter, it will be described with reference to FIG. 15 how the 80 mm adapter detecting section 31 makes the disk type recognition. This disk type recognition operation is preferably carried out when starting processing is performed on the optical disk 100 inserted.

Information about the size of the optical disk 100 (i.e., whether its diameter is 80 mm or 120 mm) is stored in a disk information area on the optical disk 100. Such disk information may be stored in the management area of the optical disk 100. If the optical disk 100 is a BD, for example, then the disk information is stored in a PIC area.

Optionally, the diameter of the given optical disk 100 may be determined to be 80 mm or 120 mm by measuring the amount of time it takes for the rotational velocity of the disk motor 2 to settle into a constant value. Supposing the voltage applied to the disk motor 2 remains the same, the amount of time it takes for the rotational velocity of the optical disk 100 to reach a predetermined value is proportional to the inertia value (which is calculated by multiplying the fourth power of the disk radius by a constant). That is why the ratio of the amount of time it takes for the rotational velocity of at 120 mm disk to reach a predetermined value to the time it takes for that of an 80 mm disk to reach the predetermined value is 81 to 16. Since there is the inertia of the disk motor 2, the actual ratio becomes 90 to 25, for example. That is to say, if it takes 9.0 seconds for the rotational velocity of a 120 mm disk to reach a predetermined value (of 1,000 rpm, for example), then it will take 2.5 seconds for that of an 80 mm disk to reach the same predetermined value. Consequently, if the amount of time it takes for the rotational velocity of the optical disk 100 to reach a predetermined value is compared with, and found shorter than, a reference value (of 5.0 seconds, for example), then the optical disk 100 may be recognized as an 80 mm disk.

Hereinafter, it will be described with reference to FIG. 15 how the optical disk drive of this preferred embodiment operates.

First, in Step 601, the disk motor 2 starts to be driven. Next, in Step 602, it is measured how long it took for the rotational velocity of the disk motor 2 to reach a predetermined value (of 1,000 rpm, for example). Subsequently, in Step 603, it is determined whether or not it has been found in Step 602 that it took 5.0 seconds or less before the rotational velocity of the disk motor 2 reached the predetermined value. If the answer is YES, the given optical disk 100 is recognized as an 80 mm disk without the 80 mm disk adapter. Otherwise, the process advances to Step 604.

In Step 604, the disk information is read out from the optical disk 100. Next, in Step 605, it is determined by reference to the disk information that has been acquired in Step 604 whether the given disk is a 120 mm disk or an 80 mm disk. If the disk information shows that this is an 80 mm disk, the optical disk 100 is recognized as an 80 mm disk with an 80 mm adapter. On the other hand, if the disk information shows that this is a 120 mm disk, then the optical disk 100 may be recognized as a disk with a diameter of 120 mm.

According to this preferred embodiment, the 80 mm adapter detecting section 31 can detect an 80 mm adapter. In this preferred embodiment, when the 80 mm adapter is detected, the optical pickup 6 is retracted so as to make a bypass to avoid the protrusion 152 of the adapter 150 shown in FIG. 4. More specifically, the location and range of the rim region 101 in the preferred embodiments described above are replaced with those of the rim region 101 of an 80 mm disk, and the magnitude of retraction is set to 0.9 mm, for example, with the height of the protrusion of the 80 mm adapter taken into account. It should be noted that the magnitude of retraction to avoid the protrusion of the 80 mm adapter is greater than that of retraction to avoid the rim 102 of the optical disk 100 with a diameter of 120 mm.

Unless the 80 mm adapter has been detected, the magnitude of retraction may be 0.5 mm, for example, which is approximately equal to that of the optical disk with a diameter of 120 mm, by reference to the height of the rim 102 of an 80 mm disk. In that case, the magnitude of retraction may be decreased compared to the disk with the 80 mm adapter. As a result, the focus ON processing can get done in a shorter time.

In the preferred embodiment described above, it is determined whether or not the disk has an 80 mm adapter. However, once the disk loaded has turned out to be a disk with a diameter of 80 mm, the bypass operation may be carried out automatically with the protrusion of an adapter taken into account, no matter whether the disk actually has the adapter or not. In that case, the components and processing for detecting the adapter may be omitted.

INDUSTRIAL APPLICABILITY

An optical disk drive according to the present invention can prevent a portion of an optical pickup from colliding against an optical disk while focus ON processing is being carried out after focus servo has failed to work, thus realizing increased reliability.

The invention claimed is:

1. An optical disk drive comprising:
an optical pickup including a light source that radiates a light beam to irradiate an optical disk, at least one objective lens for converging the light beam, and an actuator that is able to move the objective lens perpendicularly to the optical disk;
transport means for displacing the optical pickup along the radius of the optical disk;
sensing means for sensing if a beam spot position has passed a raised rim portion of the optical disk while the optical pickup is being displaced from an inner area of the optical disk toward the raised rim portion thereof by the transport means; and
control means for getting the objective lens retracted away from the optical disk by the actuator and getting the optical pickup displaced toward the inner area of the optical disk by the transport means if a beam spot position has been sensed to have passed the raised rim portion of the optical disk.

2. The optical disk drive of claim 1, wherein while the actuator is retracting the objective lens away from the optical disk right after the beam spot position has been sensed to have passed the raised rim portion of the optical disk, the control means gets the optical pickup retracted away from the optical disk for a distance that is greater than the height of the raised rim portion of the optical disk.

3. The optical disk drive of claim 2, wherein the control means starts focusing after having gotten the optical pickup displaced inside of the raised rim portion of the optical disk.

4. The optical disk drive of claim 2, wherein the sensing means is able to sense whether or not the objective lens is located at such a position as to face the raised rim portion of the optical disk.

5. The optical disk drive of claim 4, wherein if the objective lens is located at such a position as to face the raised rim portion of the optical disk when a focus servo fails to work during a read or write operation, the control means gets the objective lens retracted away from the optical disk by the actuator and also gets the optical pickup displaced inside of the raised rim portion.

6. The optical disk drive of claim 5, wherein the control means starts focus ON processing after having gotten the optical pickup displaced inward.

7. The optical disk drive of claim 1, wherein the control means gets the objective lens retracted away from the optical disk for a variable distance according to the diameter of the optical disk.

8. The optical disk drive of claim 1, wherein if the optical disk has a diameter of 80 mm, the distance for which the optical pickup gets retracted away from the optical disk is set to be greater than a distance a protrusion of an adapter extends above a surface of the optical disk.

9. The optical disk drive of claim 1, wherein the at least one objective lens includes a first objective lens having a first numerical aperture and a second objective lens having a second numerical aperture that is greater than the first numerical aperture.

10. The optical disk drive of claim 9, wherein the second numerical aperture is equal to or greater than 0.8.

11. The optical disk drive of claim 9, wherein, if the disk with the diameter of 80 mm has been inserted, the control means sets the magnitude of the retraction greater than the situation where the disk with the diameter of 120 mm has been inserted, no matter whether an adapter is used or not.

12. A method for driving an optical disk drive including an optical pickup with an objective lens for converging a light beam onto an optical disk, the method comprising the steps of:
 getting the optical pickup displaced from an inner area of the optical disk toward a raised rim portion thereof; and
 if a beam spot position has passed the raised rim portion of the optical disk, getting the objective lens retracted away from the optical disk for a distance that is greater than the height of the raised rim portion of the optical disk and getting the optical pickup displaced toward the inner area of the optical disk.

13. An optical disk drive comprising:
 an optical pickup including a light source that radiates a light beam to irradiate an optical disk, at least one objective lens for converging the light beam, and an actuator that is able to move the objective lens perpendicularly to the optical disk;
 transport means for displacing the optical pickup along the radius of the optical disk;
 sensing means for sensing whether or not the objective lens is located at such a position as to face a provided raised portion of the optical disk,
 control means for getting the objective lens retracted away from the optical disk by the actuator and getting the optical pickup displaced toward the inner area of the optical disk by the transport means if the objective lens has been sensed to be located at a position to face the provided raised portion of the optical disk.

14. An optical disk drive comprising:
 an optical pickup including a light source that radiates a light beam to irradiate an optical disk, at least one objective lens for converging the light beam, and an actuator that is able to move the objective lens perpendicularly to the optical disk;
 transport means for displacing the optical pickup along the radius of the optical disk;
 sensing means for sensing if the irradiated position of the light beam has passed an outer edge of the optical disk while the optical pickup is being displaced from an inner area of the optical disk toward the outer edge thereof by the transport means; and
 control means for getting the objective lens retracted away from the optical disk by the actuator and getting the optical pickup displaced toward the inner area of the optical disk by the transport means if a beam spot position has been sensed to have passed the outer edge of the optical disk,
 wherein, if a disk with a diameter of 80 mm has been inserted using an adapter, the control means gets the objective lens retracted away from the optical disk by the actuator for a greater distance than a situation where a disk with a diameter of 120 mm is inserted.

15. An optical disk drive comprising:
 an optical pickup including at least one light source that radiates a light beam to irradiate an optical disk, at least first and second objective lenses having respective first and second mutually different numerical apertures, wherein the first numerical aperture is lower than the second numerical aperture and an actuator that is able to move the objective lenses perpendicularly to the optical disk;
 transport means for displacing the optical pickup along the radius of the optical disk;
 sensing means for sensing whether or not at least a portion of the optical pickup faces a rim portion of the optical disk; and
 control means for getting the optical pickup displaced toward an inner area of the optical disk by the transport means such that if at least the portion of the optical pickup has been sensed to be located under the rim portion while focus ON processing is being carried out using the first objective lens having the first numerical aperture, the first objective lens used for the focus ON processing and the second objective lens that has a higher numerical aperture no longer face the rim portion.

16. The optical disk drive of claim 15, wherein the optical pickup includes a lens protecting member outside of the objective lens, and
 wherein if at least the portion of the optical pickup has been sensed to be facing the rim region, the control means gets the optical pickup displaced toward the inner area of the optical disk by the transport means such that the lens protecting member no longer faces the rim region.

* * * * *